United States Patent
Shimauchi

(10) Patent No.: US 12,231,762 B2
(45) Date of Patent: Feb. 18, 2025

(54) INFORMATION PROCESSOR, INFORMATION PROCESSING METHOD, AND PROGRAM

(71) Applicant: SONY GROUP CORPORATION, Tokyo (JP)

(72) Inventor: Kazuhiro Shimauchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 306 days.

(21) Appl. No.: 17/791,421

(22) PCT Filed: Nov. 24, 2020

(86) PCT No.: PCT/JP2020/043647
§ 371 (c)(1),
(2) Date: Jul. 7, 2022

(87) PCT Pub. No.: WO2021/145071
PCT Pub. Date: Jul. 22, 2021

(65) Prior Publication Data
US 2023/0044707 A1    Feb. 9, 2023

(30) Foreign Application Priority Data
Jan. 14, 2020    (JP) ................. 2020-003506

(51) Int. Cl.
H04N 23/63    (2023.01)
G06F 3/0482    (2013.01)
H04N 23/61    (2023.01)
H04N 23/695    (2023.01)

(52) U.S. Cl.
CPC .......... *H04N 23/631* (2023.01); *H04N 23/61* (2023.01); *H04N 23/695* (2023.01); *G06F 3/0482* (2013.01)

(58) Field of Classification Search
None
See application file for complete search history.

(56) References Cited

U.S. PATENT DOCUMENTS

| | | | |
|---|---|---|---|
| 2002/0008758 A1 | 1/2002 | Broemmelsiek et al. | |
| 2015/0373414 A1* | 12/2015 | Kinoshita | G06V 40/172 386/282 |
| 2017/0345162 A1 | 11/2017 | Bamba | |
| 2019/0174070 A1 | 6/2019 | Jang | |
| 2019/0387149 A1 | 12/2019 | Breisacher | |
| 2021/0089776 A1* | 3/2021 | Aonuma | G06F 3/167 |

FOREIGN PATENT DOCUMENTS

| | | |
|---|---|---|
| CN | 101237529 A | 8/2008 |
| EP | 967584 A2 | 12/1999 |
| JP | 2016-100696 A | 5/2016 |
| JP | 2020-141288 A | 9/2020 |

* cited by examiner

Primary Examiner — Christopher Braniff
(74) Attorney, Agent, or Firm — Paratus Law Group, PLLC

(57) ABSTRACT

An information processor according to the present technology includes a presentation processing section configured to perform a process to present a list of objects recognized in an object recognition process of a captured image to a user, and a tracking processing section configured to set a tracking range of a subject corresponding to an object selected by the user from the list presented by the presentation processing section and perform a tracking process of the subject on the basis of the set tracking range.

18 Claims, 21 Drawing Sheets

| TRACKING START RANGE | PLEASE SELECT ▽ | ～Bp1 |
| TRACKING RANGE | PLEASE SELECT ▽ | ～Bp2 |
| SEARCH RANGE | PLEASE SELECT ▽ | ～Bp3 |
| OUT-OF-SEARCH RANGE | PLEASE SELECT ▽ | ～Bp4 |

B

| TRACKING START RANGE | PLEASE SELECT ▽ | ～Bp1 |
| TRACKING RANGE | PLEASE SELECT | PLATFORM / THING TO WRITE ON / TEACHER DESK / SPECIFY COORDINATES |
| SEARCH RANGE | PLEASE SELECT | |
| OUT-OF-SEARCH RANGE | PLEASE SELECT ▽ | ～Bp4 |
| | | SEATING SECTION / DISPLAY / SPECIFY COORDINATES |

F I G . 1 0

| TRACKING START RANGE | TEACHER DESK, PLATFORM, THING TO WRITE ON |
|---|---|
| TRACKING RANGE | TEACHER DESK, PLATFORM, THING TO WRITE ON, DISPLAY |
| SEARCH RANGE | TEACHER DESK, PLATFORM, THING TO WRITE ON |
| OUT-OF-SEARCH RANGE | SEATING SECTION, DISPLAY |

INFORMATION PROCESSOR, INFORMATION PROCESSING METHOD, AND PROGRAM

CROSS REFERENCE TO PRIOR APPLICATION

This application is a National Stage patent application of PCT International Patent Application No. PCT/JP2020/043647 (filed on Nov. 24, 2020) under 35 U.S.C. § 371, which claims priority to Japanese Patent Application No. 2020-003506 (filed on Jan. 14, 2020), which are all hereby incorporated by reference in their entirety.

TECHNICAL FIELD

The present technology relates to an information processor, an information processing method, and a program, in particular, a technical field related to setting of a tracking range of a subject.

BACKGROUND ART

An example of a known imager is an imager of a type referred to as what is generally called a PTZ camera. The PTZ camera is a camera equipped with a zoom function to change an imaging angle of view through use of a zoom lens and a pan-tilt function to change an imaging direction in a panning direction and a tilting direction.

The PTZ camera can capture a specific subject in a specific size within a frame of view with the use of the zoom function and, further, can perform imaging such that the subject is tracked, as it is called, that is, the specific subject is maintained at a specific position such as a middle position within the frame of view by virtue of the use of a pan-tilt function.

It should be noted that examples of a related conventional technology may include PTL 1 described below. PTL 1 discloses a technology of setting a preset imaging position of a monitoring camera at a position corresponding to a region where a detection frequency of a monitoring target is high.

CITATION LIST

Patent Literature

[PTL 1]
Japanese Patent Laid-Open No. 2016-100696

SUMMARY

Technical Problem

Here, a range where a subject can be tracked is set by a movable range in a panning/tilting direction and a focal length of a lens. However, tracking of the subject is not always performed all over the tracking-possible range. For example, in a case where an object that is not desired to be displayed is included within the tracking-possible range, a range where tracking is to be performed (hereinafter, referred to as a "tracking range") is set with a region where the object is placed being excluded and tracking of a subject is to be performed only within the set tracking range in some cases.

Conventionally, a tracking range has been usually set by a manual operation of a user. In particular, in a case where a subject is to be tracked with a PTZ camera, a user sets a tracking range by performing a pan-tilt adjustment operation while looking at a captured image and designating panning and tilting angles corresponding to each of a left upper corner, a right upper corner, a left lower corner, and a right lower corner of a search range, which imposes a huge burden on the user.

The present technology is provided in view of the above-described circumstances, and an object thereof is to reduce an operational burden on a user related to setting of a tracking range of a subject.

Solution to Problem

An information processor according to the present technology includes a presentation processing section configured to perform a process to present a list of objects recognized in an object recognition process of a captured image to a user, and a tracking processing section configured to set a tracking range of a subject corresponding to an object selected by the user from the list presented by the presentation processing section and perform a tracking process of the subject on the basis of the set tracking range.

Thus, it can be sufficient that an operation necessary for setting the tracking range of the subject is at least only an operation to select an object from the list.

In the above-described information processor according to the present technology, the presentation processing section can be configured to perform a process to present, as the list of the objects, a candidate list for the tracking range and a candidate list for a tracking start range of the subject, and the tracking processing section can be configured to set, in a case where an object is selected from the candidate list for the tracking start range, the tracking start range corresponding to the selected object.

By virtue of setting the tracking start range, the tracking process of the subject can be started from a range where the subject is likely to exist at the start of imaging.

In the above-described information processor according to the present technology, the presentation processing section can be configured to perform a process to present, as the list of the objects, a candidate list for the tracking range and a candidate list for a search range that is a search range where, in a case where the subject is lost, the subject is to be searched for, and the tracking processing section can be configured to set, in a case where an object is selected from the candidate list for the search range, the search range corresponding to the selected object.

By virtue of setting the search range, in a case where a subject being tracked is lost, search for the subject can be performed with a range where the subject is highly likely to exist set as a target.

In the above-described information processor according to the present technology, the presentation processing section can be configured to perform a process to present, as the list of the objects, a candidate list for the tracking range and a candidate list for an out-of-search range that is a range excluded from a target for search for the subject, and the tracking processing section can be configured to set, in a case where an object is selected from the candidate list for the out-of-search range, the out-of-search range corresponding to the selected object.

By virtue of setting the out-of-search range, an undesirable range to be included in a subject search range in terms of appropriately performing tracking of a subject that is a target, such as a range where a subject that is not a tracking target is supposed to exist, can be excluded to perform search for the subject.

In the above-described information processor according to the present technology, the presentation processing section can be configured to perform a process to present, as the list of the objects, a candidate list for the tracking range and a candidate list for a different range that is a range related to the tracking process different from the tracking range, and perform a process to present, as the candidate list for the tracking range and the candidate list for the different range, lists objects listed on which are at least partially different.

This makes it possible to present an object suitable as a candidate for each of the tracking range and the different range.

In the above-described information processor according to the present technology, the presentation processing section can be configured to perform a process to present the candidate list for the tracking range and the candidate list for the different range on the basis of correspondence relation information indicating a correspondence relation of objects to be listed for each of the tracking range and the different range.

This makes it possible to present only an object suitable as a candidate for each range by a simple process, that is, generating the candidate list with reference to the correspondence relation information.

In the above-described information processor according to the present technology, the presentation processing section can be configured to perform a process to present, as the list of the objects, a candidate list for the tracking range and a candidate list for a different range that is a range related to the tracking process different from the tracking range, and perform a process to present the candidate list for the tracking range and the candidate list for the different range on the basis of histories of selection of an object from each of the candidate lists.

This makes it possible to present only an object suitable for each range as a candidate on the basis of the history of selection of the objects.

In the above-described information processor according to the present technology, the presentation processing section can be configured to perform a process to present, as the candidate list for the tracking range and the candidate list for the different range, lists where objects selected on the basis of frequency of selection according to the histories of selection are listed.

This makes it possible to present, as a candidate, only an object presumed to be suitable for each range according to a high frequency of a previous selection.

In the above-described information processor according to the present technology, the presentation processing section can be configured to perform, in a case where an object is selected from the list, a process to present information indicating a range corresponding to the selected object on the captured image.

This enables the user to see the range of the object selected by him/her on the captured image.

In the above-described information processor according to the present technology, the presentation processing section can be configured to perform, in response to an operation being applied to the information indicating the range presented on the captured image, a process to change a size or a shape of the range.

Thus, while information indicating a corresponding range is caused to be presented in response to an object being selected from the list, the user can apply an operation to the information indicating the range, thereby issuing an instruction to change the size or shape of the range.

In the above-described information processor according to the present technology, the presentation processing section can be configured to perform, in a case where a plurality of objects is selected from the list, a process to present information indicating ranges including the selected objects on the captured image. Thus, in a case where the user wants to set a tracking range covering a plurality of objects, the user only has to perform at least an operation to select these objects from the list.

In the above-described information processor according to the present technology, the presentation processing section can be configured to perform a process to present the candidate list for the tracking range and the candidate list for the out-of-search range such that an object selected from either one of the candidate lists is not presented in a selectable state in the other one of the candidate lists.

This makes it possible to prevent inconsistent selection from being performed, the inconsistent selection including selecting an object selected for the tracking range also as an object for the out-of-search range and selecting an object selected for the out-of-search range also as an object for the tracking range, inversely.

In the above-described information processor according to the present technology, the presentation processing section can be configured to perform, in a case where an object selected from either one of the candidate list for the tracking range and the candidate list for the out-of-search range is selected from the other one of the candidate lists, a process to present error information.

This makes it possible to provide an error notification to the user in response to an inconsistent selection being done.

In the above-described information processor according to the present technology, the presentation processing section can be configured to generate and present the list to the user, the list including, as an option, information indicating a position-history-dependent range that is a range set on the basis of history information regarding a position of the subject.

This makes it possible to present a range supposed to be suitable for performing tracking according to the position history of the subject, such as a range where the subject frequently passes, as a candidate for the tracking range.

In the above-described information processor according to the present technology, the subject can include a teacher, and the presentation processing section can be configured to set the position-history-dependent range on the basis of, among the history information regarding the position stored on a teacher-by-teacher basis, the history information regarding the teacher who is a tracking target.

Different teachers may have different characteristics of movement during a lecture. For example, a teacher frequently moves during a lecture, whereas another teacher does not frequently move during a lecture.

In the above-described information processor according to the present technology, in the object recognition process, a recognition process of at least one object among a platform, a teacher desk, and a thing to write on can be performed, and the presentation processing section can be configured to perform a process to present the list to the user, the list including the at least one of the platform, the teacher desk, and the thing to write on recognized in the object recognition process.

This makes it possible to achieve setting of the tracking range based on objects arranged in the classroom where a lecture is given.

In addition, an information processing method according to the present technology is an information processing method in which an information processor is configured to perform a process to present a list of objects recognized in an object recognition process of a captured image to a user, set a tracking range of a subject corresponding to an object selected by the user from the presented list, and perform a tracking process of the subject on the basis of the set tracking range. Such an information processing method can also provide workings and effects similar to those of the above-described information processor according to the present technology.

A program according to the present technology is a program configured to cause an information processor to implement a function to perform a process to present a list of objects recognized in an object recognition process of a captured image to a user, set a tracking range of a subject corresponding to an object selected by the user from the presented list, and perform a tracking process of the subject on the basis of the set tracking range.

By virtue of such a program, the above-described information processor according to the present technology is implemented.

BRIEF DESCRIPTION OF DRAWINGS

FIG. 9 depicts diagrams each for explaining a presentation example of a list of objects.

FIG. 10 is a diagram for explaining an example of correspondence relation information according to the embodiment.

DESCRIPTION OF EMBODIMENT

An embodiment will be described in the following order.
<1. Tracking Imaging System>
[1-1. Configuration of System]
[1-2. Regarding Tracking Imaging]
<2. Range Setting Technique as Embodiment>
<3. Process Steps>
<4. Various Modification Examples>
[4-1. First Modification Example]
[4-2. Second Modification Example]
[4-3. Third Modification Example]
[4-4. Fourth Modification Example]
<5. Other Modification Examples>
<6. Summary of Embodiment>
<7. Present Technology>

1. Tracking Imaging System

Figure 1:
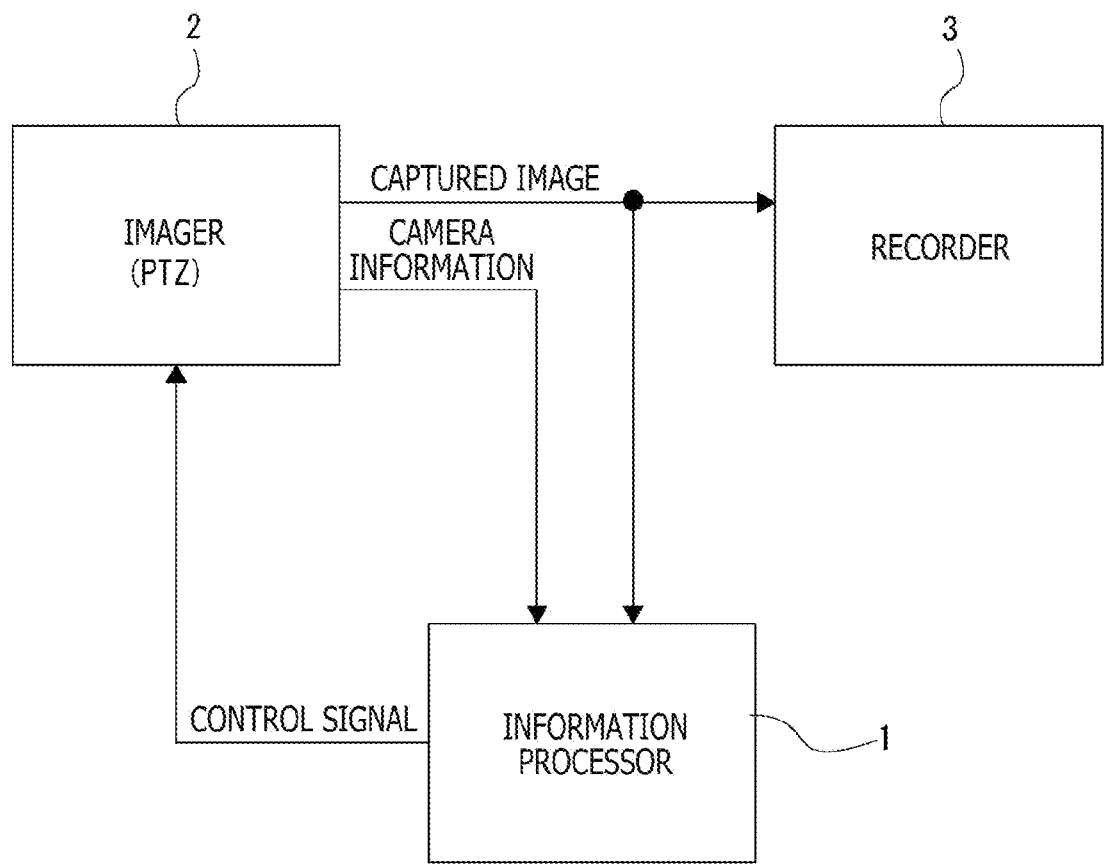
FIG. 1 is a block diagram illustrating a configuration example of a tracking imaging system including an information processor as an embodiment of the present technology.

[1-1. Configuration of System]
FIG. 1 is a block diagram illustrating a configuration example of a tracking imaging system 100 including an information processor 1 as an embodiment of the present technology.

The tracking imaging system 100 includes at least the information processor 1, an imager 2, and a recorder 3 as illustrated.

The imager 2 is in the form of a PTZ camera having a function to mechanically pan and tilt and being capable of performing adjustment of a focal length through use of a zoom lens (i.e., adjustment of an angle of view). The imager 2 adjusts a focal length and adjusts an imaging direction by panning and tilting on the basis of a control signal outputted from the information processor 1.

The imager 2, which includes, for example, an imaging element in the form of an imaging sensor such as a CMOS (Complementary metal-oxide-semiconductor) image sensor or a CCD (Charge Coupled Device) image sensor, is capable of generating captured image data in the form of a moving image. The captured image data acquired by the imager 2 is outputted to the information processor 1 and the recorder 3.

In addition, the imager 2 outputs camera information, such as information regarding angles in a panning direction and a tilting direction and information regarding a focal length, to the information processor 1.

The information processor 1, which is in the form of, for example, a computer apparatus, has an image analysis function to perform image analysis on a captured image inputted from the imager 2 and a function to control a motion of the imager 2 (a pan-tilt-zoom control function) based to the above-described control signal.

In particular, the information processor 1 of the present example has, as one of image analysis functions, a subject detection function to detect a specific subject. The information processor 1 then performs, in response to detection of the specific subject by this subject detection function, a tracking process targeted at the subject. Here, the tracking process of a subject means a process causing the subject, or target, to be maintained at a specific position within an output image frame of a captured image. In the present example, tracking of the subject is achievable by a pan-tilt control of an imaging direction. That is, the information processor 1 performs, as the tracking process in this case, the pan-tilt control of the imager 2 according to the above-described control signal to cause the subject to be maintained at the specific position within the output image frame.

In addition, the information processor 1 of the present example also performs a setting process of various ranges related to the tracking process of the subject, the ranges including a tracking range, that is, a range where the subject is to be tracked. It should be noted that such a setting process of the various ranges will be described later again.

The recorder 3 has a function to record the captured image data inputted from the imager 2.

Figure 2:
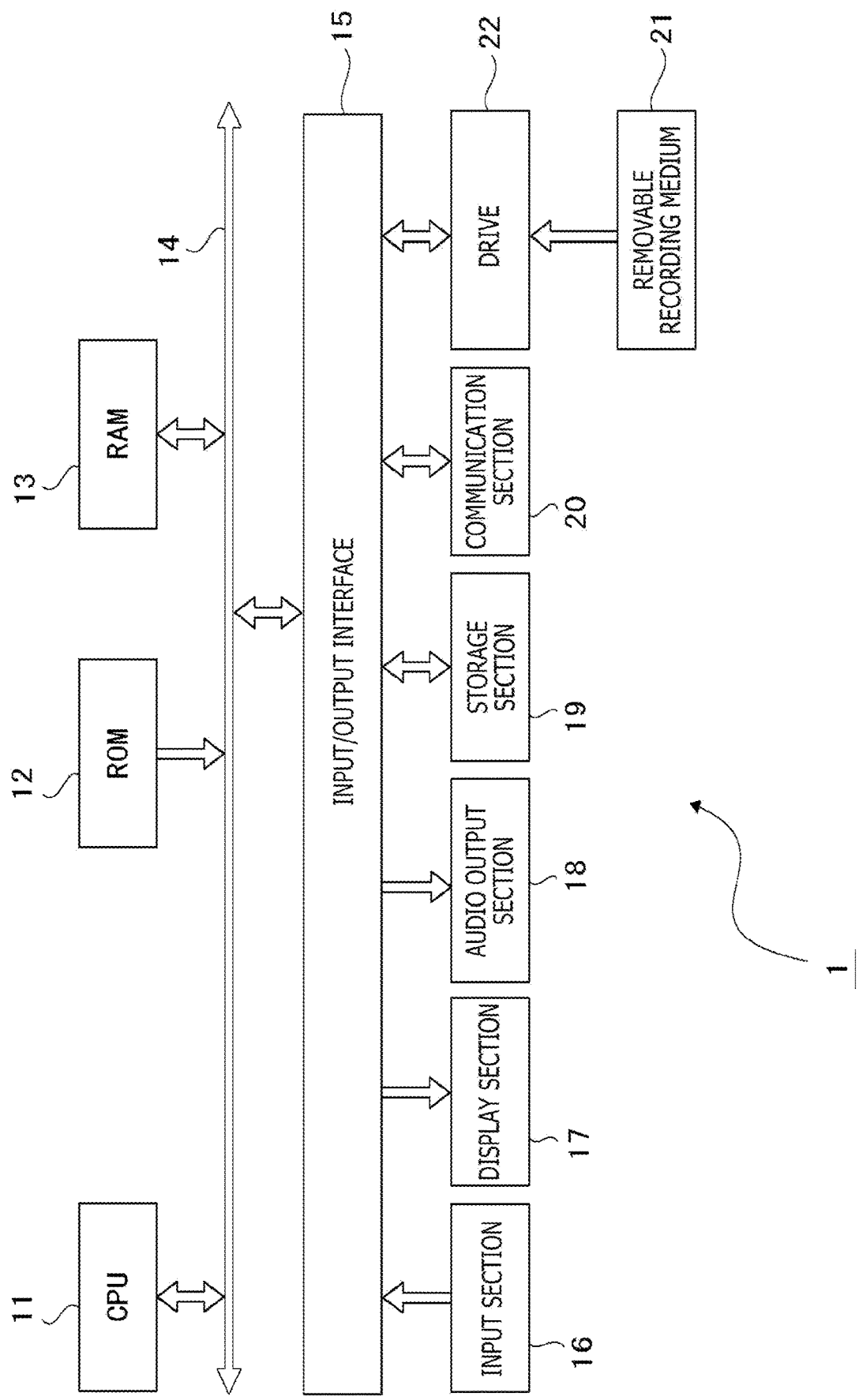
FIG. 2 is a block diagram illustrating a hardware configuration example of the information processor as the embodiment.

FIG. 2 is a block diagram illustrating a hardware configuration example of the information processor 1.

The information processor 1 includes a CPU (Central Processing Unit) 11, a ROM (Read Only Memory) 12, a RAM (Random Access Memory) 13, a bus 14, an input/output interface 15, an input section 16, a display section 17, an audio output section 18, a storage section 19, a communication section 20, and a drive 22 as illustrated.

The CPU 11 performs various processes according to a program stored in the ROM 12 or a program loaded into the RAM 13 from the storage section 19. Data necessary for the CPU 11 to perform various processes, etc. are also stored in the RAM 13, as appropriate.

The CPU 11, the ROM 12, and the RAM 13 are connected to each other through the bus 14. The input/output interface 15 is also connected to the bus 14.

The input section 16, which includes an operation part or an operation device, is connected to the input/output interface 15.

For example, the input section 16 is assumed to be any of various operation parts or operation devices such as a keyboard, a mouse, a key, a dial, a touch panel, a touch pad, and a remote controller.

A user operation is detected by the input section 16, and a signal corresponding to the inputted operation is interpreted by the CPU 11.

In addition, the display section 17, which is in the form of an LCD (Liquid Crystal Display) or an organic EL (Electroluminescence) panel or the like, and the audio output section 18, which is in the form of a speaker or the like, are connected integrally or as separate components to the input/output interface 15.

The display section 17 is a display section that performs various kinds of display and includes, for example, a display device mounted on an enclosure of the information processor 1, a separate display device connected to the information processor 1, or the like. The display section 17 displays various kinds of information on a display screen on the basis of instructions from the CPU 11. For example, the display section 17 displays, as what is generally called a GUI (Graphical User Interface), various operation menus, icons, messages, etc. on the basis of the instructions from the CPU 11. In addition, the display section 17 can display a captured image inputted from the imager 2.

The input/output interface 15 is connected to the storage section 19, which includes a hard disk, a solid-state memory, or the like, and the communication section 20, which includes a modem or the like.

The communication section 20 performs a communication process through a transmission line such as the Internet and communicates with various apparatuses by wire/wireless communication, bus communication, or the like. In the present example, communication between the imager 2 and the information processor 1 is performed via the communication section 20.

In addition, the input/output interface 15 is connected to the drive 22, if necessary, and has a removable recording medium 21, such as a magnetic disk, an optical disk, a magneto-optical disk, or a semiconductor memory, attached thereto, as appropriate. The drive 22 enables a data file such as an image file, various computer programs, etc. to be read from the removable recording medium 21. The read data file is stored in the storage section 19, or an image or audio contained in the data file is outputted by the display section 17 or the audio output section 18. In addition, a computer program or the like read from the removable recording medium 21 is installed in the storage section 19, if necessary.

[1-2. Regarding Tracking Imaging]

Here, an example where the tracking imaging system 100 is used to capture a lecture is given in the following description. Specifically, the imager 2 is placed at a position to capture an image of the interior of a classroom or the like where a lecture is to be given, and obtains a captured image displaying a teacher giving the lecture. At this time, a tracking target is the teacher, and a tracking process targeted at the teacher is started in response to detection of a subject, that is, the teacher, within the captured image.

In order that such tracking imaging targeted at a specific subject is appropriately performed, the following various ranges related to tracking are set in the tracking imaging system 100 prior to the start of imaging.

—Tracking Start Range (Home Position)

It is a range where tracking is to be started, and tracking is started in response to a target subject appearing within the tracking start range.

—Tracking Range

It is a range where the target subject is to be tracked. For example, it is defined by an angular range in the panning direction and an angular range in the tilting direction. In other words, when a movable range in the panning direction and the tilting direction as a whole reaches a maximum range, the tracking range is defined as a range equal to or smaller than the maximum range.

—Search Range (Recovery Position)

It is a range where, in a case where a tracking-target subject is lost, the subject is to be searched for. It should usually be set as a range including a region where the tracking-target subject often passes.

—Out-of-Search Range (Mask Area)

It is a range where a search for a subject is not to be performed for the purpose of tracking. For example, a range where a subject that is not a tracking target, such as a place where audience exist, is set, thereby preventing the subject that is not the tracking target from being erroneously tracked.

Figure 3:
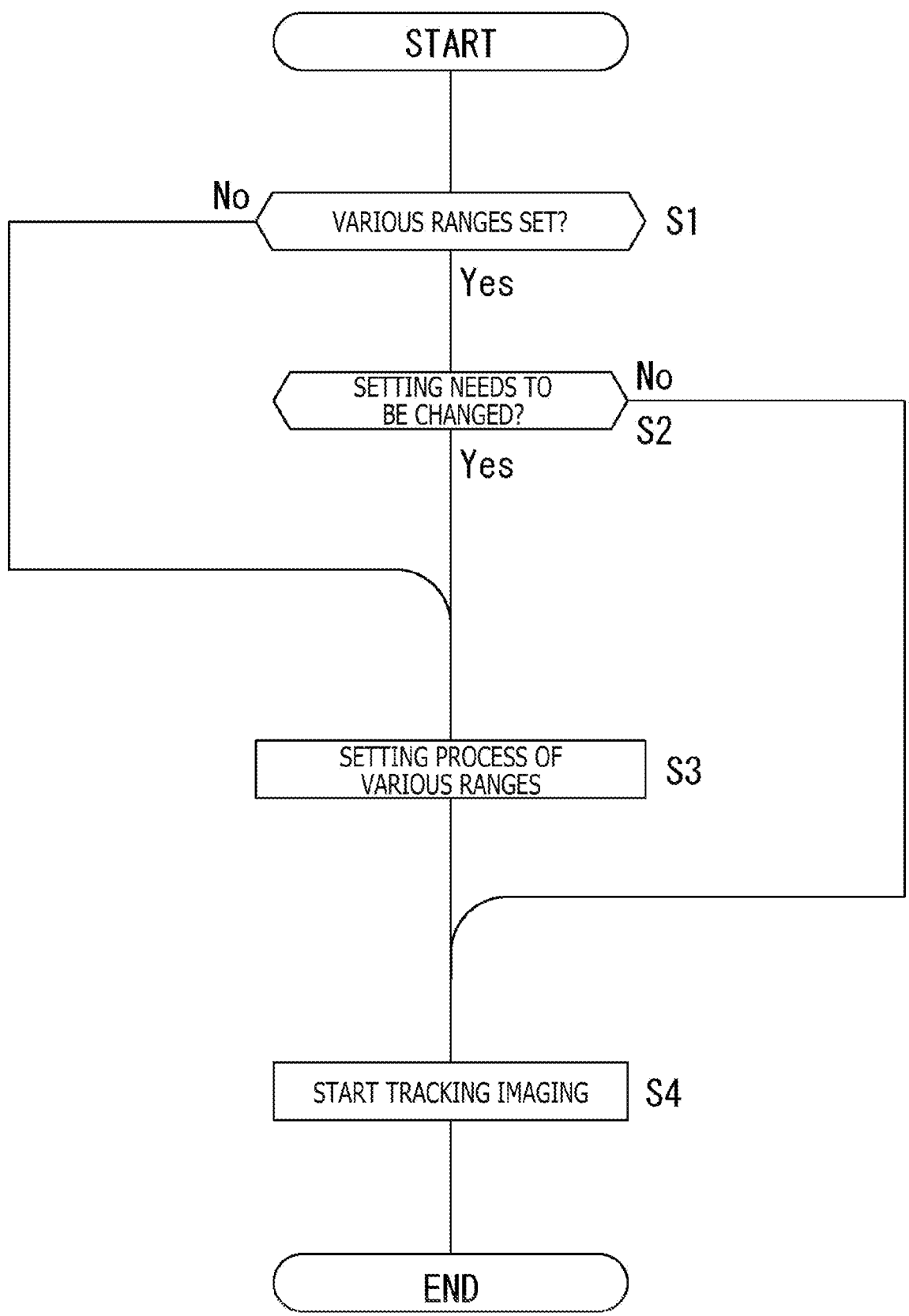
FIG. 3 is a flowchart for explaining a flow for setting various ranges related to tracking of a subject.

Referring to a flowchart in FIG. 3, description will be made on a flow for setting these various ranges. First, as illustrated as Step S1 in the figure, it is determined whether or not the various ranges have been set and, if not, the process proceeds to Step S3 to perform a setting process of the various ranges. That is, a process for setting the various ranges, i.e., the above-described tracking start range, tracking range, search range, and out-of-search range, is performed.

Then, in response to the setting process of the various ranges being performed in Step S3, tracking imaging is started in Step S4. For the tracking imaging, a tracking process based on information regarding the various ranges set in Step S3 is performed.

In contrast, in a case where the various ranges are determined to have been set in Step S1, it is determined whether or not the setting needs to be changed in Step S2. That is, it is determined whether or not information regarding the already set various ranges needs to be changed. For example, even in the same classroom, a position of a thing not desired to appear within a captured image (a tracked captured image) may be different in a case where a different lecture is to be given and, accordingly, it is assumed that, for example, the tracking range, the search range, or the like is desired to be changed. In Step S2, for example, in view of such a situation, it is determined whether or not the already set various ranges need to be changed.

In a case where the setting is determined to need to be changed in Step S2, tracking imaging is started in Step S4 after the setting process in Step S3 is performed. In contrast, in a case where the setting is not determined to need to be changed in Step S2, the setting process in Step S3 is skipped and tracking imaging is started in Step S4.

Here, the setting process of the various ranges to be performed in Step S3 is conventionally performed as a process of setting the various ranges on the basis of a user operation. Specifically, the user is required to perform a pan-tilt adjustment operation while looking at a captured image for each of the various ranges, i.e., the above-described tracking start range, tracking range, search range, and out-of-search range, and designate panning and tilting angles for defining the range.

The user is thus conventionally forced to bear a heavy operational burden.

Accordingly, an object of the present embodiment is to reduce an operational burden on a user in setting the various ranges related to tracking of a subject.

2. Range Setting Technique as Embodiment

Figure 4:
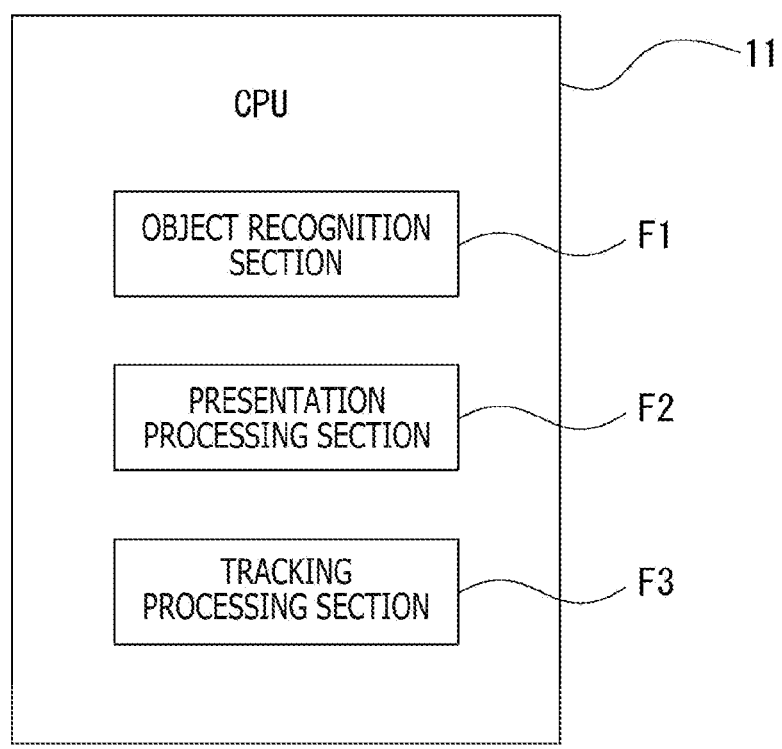
FIG. 4 is a functional block diagram illustrating various functions of the information processor as the embodiment in block form.

FIG. 4 is a functional block diagram illustrating various functions of the CPU 11 of the information processor 1 in block form. It should be noted that FIG. 4 illustrates, among the various functions of the CPU 11, only some functions related to tracking imaging.

The CPU 11 has functions as an object recognition section F1, a presentation processing section F2, and a tracking processing section F3 as illustrated.

The object recognition section F1 applies an object recognition process to a captured image from the imager 2. That is, it is a process of recognizing an object appearing within the image. The object recognition process can also be referred to as a process of analyzing a structure of a real space appearing within the captured image. A specific technique of object recognition is not limited to particular one. For example, a conventional technology such as an AI (artificial intelligence) image recognition technology is usable.

Figure 5:
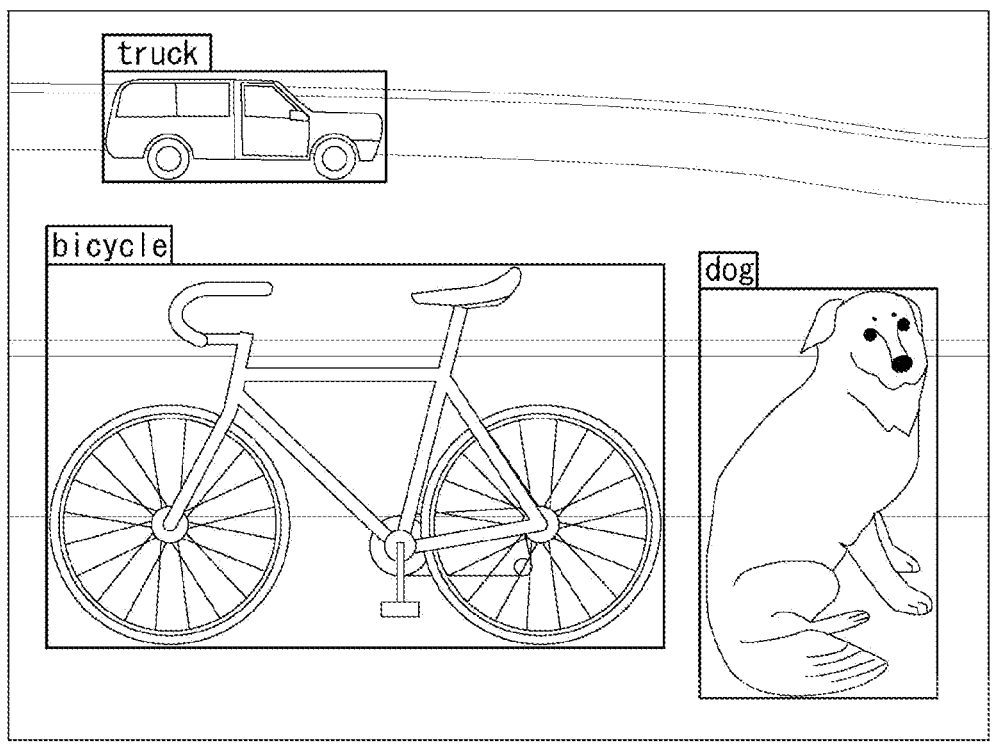
FIG. 5 is a diagram of assistance in explaining an example of an object recognition technology (a generic object recognition technology).
Figure 6:
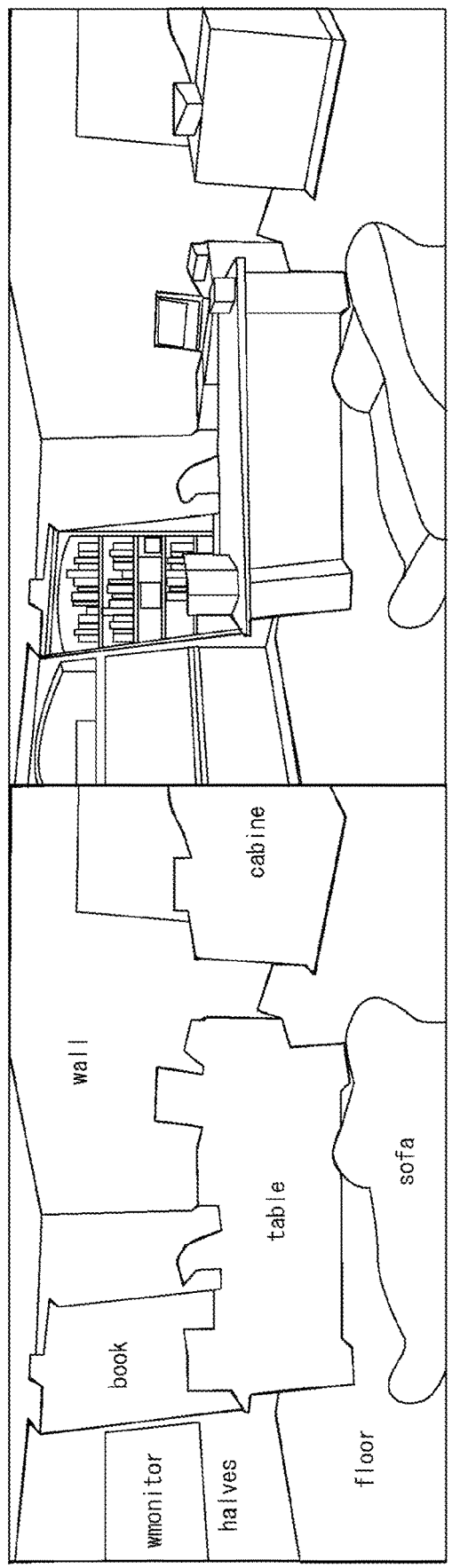
FIG. 6 is a diagram of assistance in explaining the example of an object recognition technology (semantic segmentation).

For example, a position of the object appearing within the image and/or a name (category) of the object are identified by a typical object recognition technology as illustrated in FIG. 5. Alternatively, the position and/or name of the object can be identified by semantic segmentation as illustrated in FIG. 6.

Figure 7:
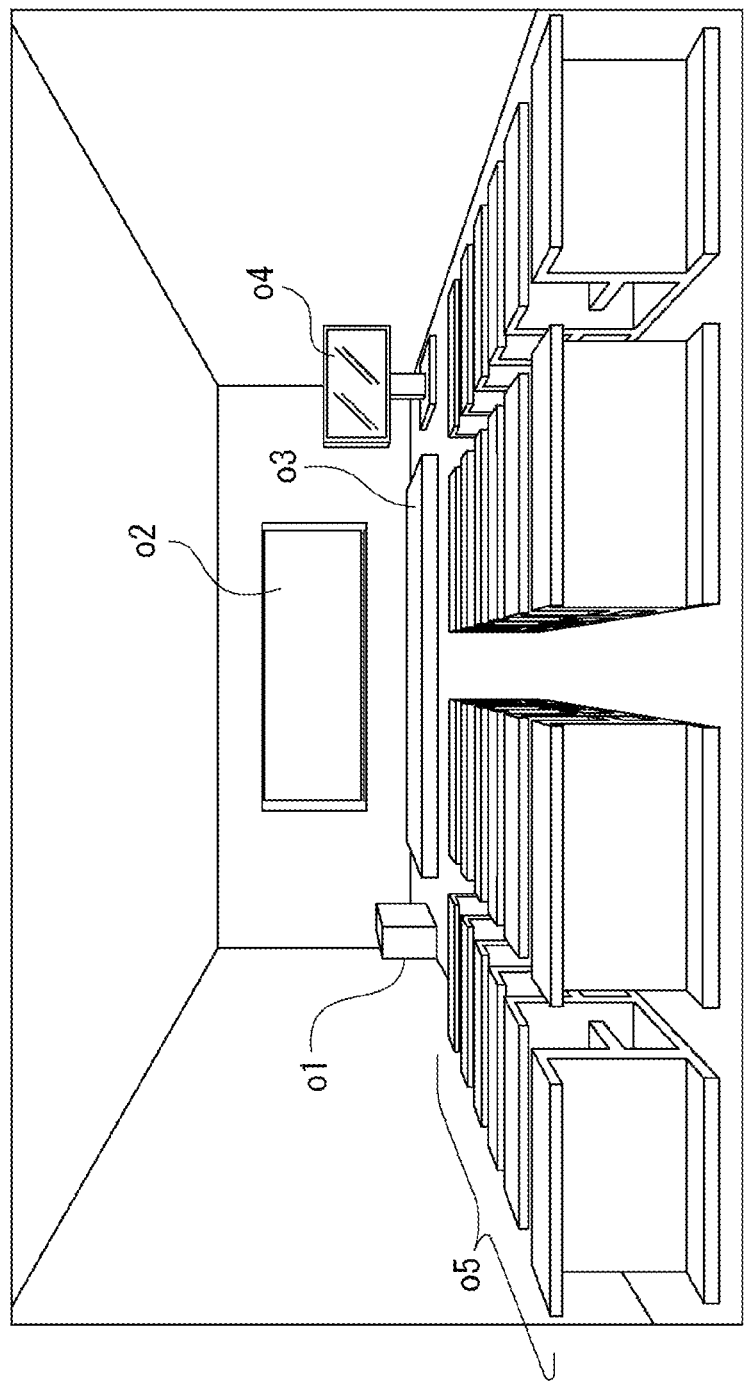
FIG. 7 is a diagram for explaining examples of various objects that may be targets for object recognition in the embodiment.
Figure 8:
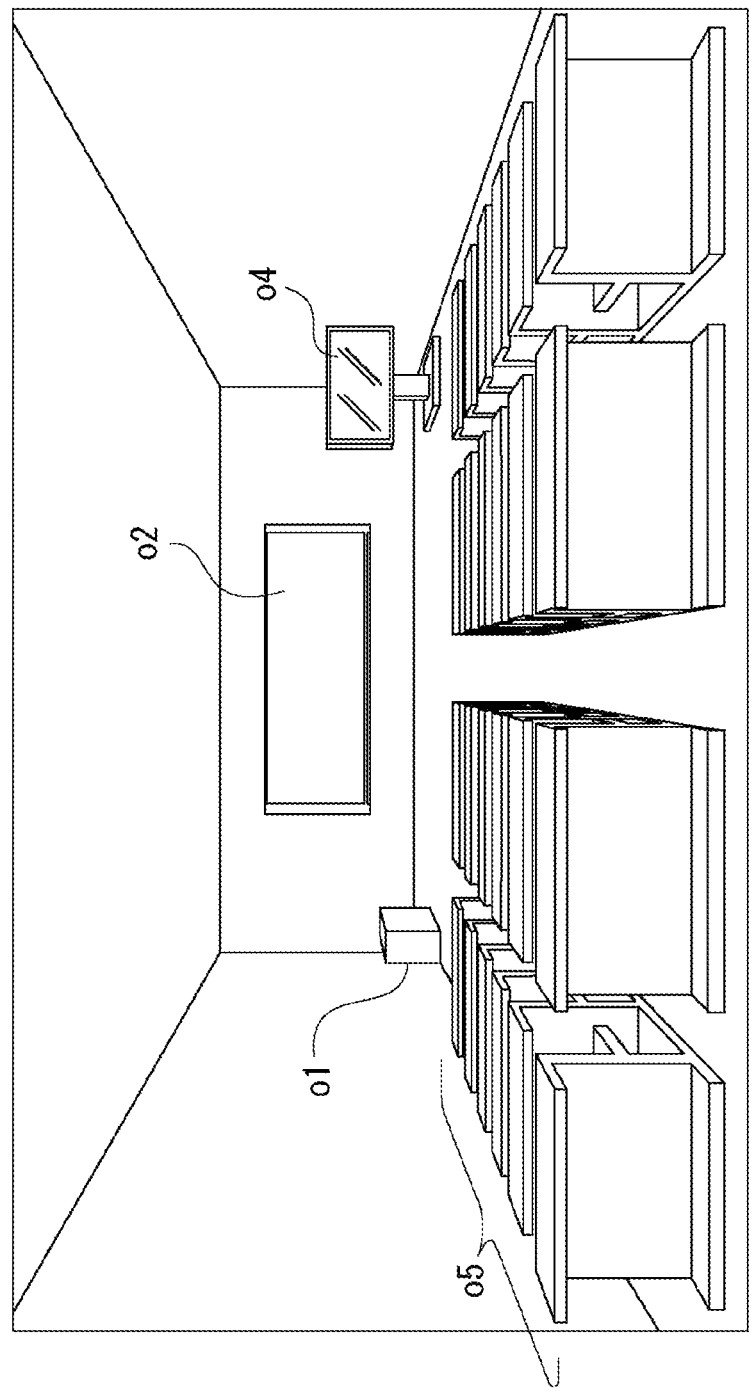
FIG. 8 is likewise a diagram for explaining examples of various objects that may be targets for object recognition in the embodiment.

FIG. 7 and FIG. 8 are diagrams for explaining examples of various objects any of which is to be a target for object recognition in the present embodiment.

Since an environment that is an imaging target is a classroom where a lecture is to be given in the present embodiment as described above, target objects for recognition in the object recognition process are various objects placed inside the classroom.

FIG. 7 illustrates an example of a classroom where a teacher desk o1, a thing to write on o2, a platform o3, a display o4, and a seating section o5 are placed. Here, the thing to write on o2 means a medium on which writing is performed by a teacher, which may be, for example, a blackboard, a whiteboard, or the like. The display o4 is, for example, a display apparatus that displays and outputs an image that is to be referred to during a lecture, and the seating section o5 means a section where seats and/or desks where attendees such as students are to be seated.

The classroom illustrated in FIG. 8 corresponds to the classroom in FIG. 7 with omission of the platform o3.

In FIG. 4, the object recognition section F1 outputs, for each recognized object, information indicating a range of the object (for example, coordinates and a size of a circumscription frame of the object) and information indicating the name thereof as information regarding a result of the object recognition process.

The presentation processing section F2 performs a process of presenting a list of objects recognized in the above-described object recognition process to a user. The list of objects is presented to the user through the display section 17 illustrated in FIG. 2.

The tracking processing section F3 sets a tracking range of a subject corresponding to one of the objects selected by the user from the list presented by the presentation processing section F2 and performs a tracking process of the subject on the basis of the selected tracking range.

As described below, in the present example, the presentation processing section F2 presents lists of objects not only for the tracking range but also for other ranges, that is, the above-described tracking start range, search range, and out-of-search range.

Accordingly, the tracking processing section F3 separately sets the tracking start range, the tracking range, the search range, and the out-of-search range on the basis of respective results of user selection of the objects from the lists of these ranges. The tracking process of the subject is then performed on the basis of information regarding each of the set ranges.

FIG. 9 depicts diagrams each for explaining a presentation example of a list of objects.

FIG. 9A illustrates an example of an image (GUI) for operation reception, which is caused to be displayed on the display section 17 by the presentation processing section F2 in setting the various ranges.

In the image for operation reception, a pull-down button Bp is displayed for each of the various ranges, i.e., the tracking start range, the tracking range, the search range, and the out-of-search range. Here, in order to distinguish the pull-down buttons Bp, the pull-down buttons Bp for the tracking start range, the tracking range, the search range, and the out-of-search range are referred to by using reference signs "Bp1," "Bp2," "Bp3," and "Bp4," respectively, as illustrated.

FIG. 9B illustrates, as an example of transition of display from FIG. 9A, an example of transition in a case where the pull-down button Bp1 (the tracking start range) and the pull-down button Bp4 (the out-of-search range) are operated.

In response to the pull-down button Bp being operated, the list of objects for the range corresponding to the operated pull-down button Bp is displayed in a pull-down manner. In the illustrated example, a list that includes "PLATFORM," "THING TO WRITE ON," and "TEACHER DESK" is displayed as the list of objects corresponding to the tracking start range in response to the pull-down button Bp1 being operated, while a list that includes "SEATING SECTION" and "DISPLAY" is displayed as the list of objects corresponding to the out-of-search range in response to the pull-down button Bp4 being operated.

For example, in a case where "TEACHER DESK" is selected from the list of the tracking start range, the tracking processing section F3 sets a range corresponding to a position of the teacher desk o1 as the tracking start range. Here, the operation for selecting the object may be an operation such as a click operation or a tap operation.

In addition, in a case where "SEATING SECTION" is selected from the list of the out-of-search range, the tracking processing section F3 sets a range corresponding to a position of the seating section o5 as the out-of-search range. This similarly applies to the tracking range and the search range. In a case where objects are selected from the lists displayed in a pull-down manner in response to the pull-down buttons Bp2 and Bp3 being operated, the tracking processing section F3 sets ranges corresponding to positions of the respective selected objects as the tracking range and the search range.

This eliminates the necessity for a user to perform, in setting the various ranges related to tracking of the subject, a pan-tilt operation to specify each range. This makes it possible to reduce an operational burden on the user in setting the various ranges related to tracking of the subject.

It should be noted that the lists of objects each include an item "SPECIFY COORDINATES" in the illustrated example. Although illustration is omitted, in a case where the item "SPECIFY COORDINATES" is selected, the user can specify coordinates for specifying a range via the captured image displayed on the display section 17. That is, any range can be set irrespective of the range of the recognized object.

Here, concerning the respective lists of objects presented for the various ranges, it can be determined which object is to be listed on each list as desired. In the present example, different objects are listed at least between some of the ranges.

To generate the list of objects for each of the various ranges, the presentation processing section F2 of the present example uses correspondence relation information I1 as illustrated in FIG. 10.

As illustrated in FIG. 10, the correspondence relation information I1 is information where identification information (for example, name information) regarding a possible object to be listed on the list for each of the various ranges, i.e., the tracking start range, the tracking range, the search range, and the out-of-search range. Specifically, in the correspondence relation information I1 of the present example, "TEACHER DESK," "PLATFORM," and "THING TO WRITE ON" are defined as possible objects to be listed on the list of the targets tracking start range, and "TEACHER DESK," "PLATFORM," "THING TO WRITE ON," and "DISPLAY" are defined as possible objects to be listed on the list of the tracking range. In addition, "TEACHER DESK," "PLATFORM," and "THING TO WRITE ON" are defined as possible objects to be listed on the list of the search range, and "SEATING SECTION" and "DISPLAY" are defined as possible objects to be listed on the list of the out-of-search range.

The presentation processing section F2 generates, in response to an object recognition result being obtained from the object recognition section F1, the list of each range, according to such correspondence relation information I1. Specifically, a list including, among the objects defined in the correspondence relation information I1, all the objects actually recognized for each of the various ranges, i.e., the tracking start range, the tracking range, the search range, and the out-of-search range, is generated.

By virtue of the list of each range being generated on the basis of the correspondence relation information I1 as described above, an object suitable as a candidate for each range can be presented to a user, and an unnecessary candidate is prevented from being listed on the list, which makes it possible to reduce a burden on the user in selecting an object from the list.

Here, as understood with reference to the correspondence relation information I1 in FIG. 10, in the present example, lists where listed objects are at least partially different are presented at least between the tracking range and the out-of-search range. Specifically, "SEATING SECTION" is listed on the list of the out-of-search range, whereas no "SEATING SECTION" is listed on the list of the tracking range.

If the seating section o5, which is a place where there is a subject that is not a tracking target as described above, is included in the tracking range, it would be difficult to stably track the subject. Accordingly, in the present example, "SEATING SECTION" is listed on the list of the out-of-search range, whereas no "SEATING SECTION" is listed on the list of the tracking range.

For the tracking start range and the search range, this similarly applies to "SEATING SECTION" as for the tracking range. Accordingly, "SEATING SECTION" is listed on the list of neither the tracking start range nor the search range in the present example.

Here, "DISPLAY," on which an image of a person appears (which can become a cause for erroneous tracking) in some cases, is included as a candidate to be listed on the list of the out-of-search range in the present example.

It should be noted that the example where objects listed on the list are different between the out-of-search range and the other ranges is given above. However, for example, objects listed on the list can be different between the ranges of any other combination, such as between the tracking start range and the tracking range or between the tracking range and the search range. For example, in the example in FIG. 10, objects listed on the list are different between the tracking start range and the tracking range (presence/absence of "DISPLAY"). In addition, in the example in FIG. 10, objects listed on the list are different also between the tracking range and the search range (likewise, presence/absence of "DISPLAY").

The presentation processing section F2 of the present example causes the list generated as described above for each of the various ranges to be displayed in response to the pull-down button Bp being operated (see FIG. 9), allowing a user to select an object from the displayed list as desired to specify a range corresponding to the selected object for each of the tracking start range, the tracking range, the search range, and the out-of-search range, as described above.

Figure 11:
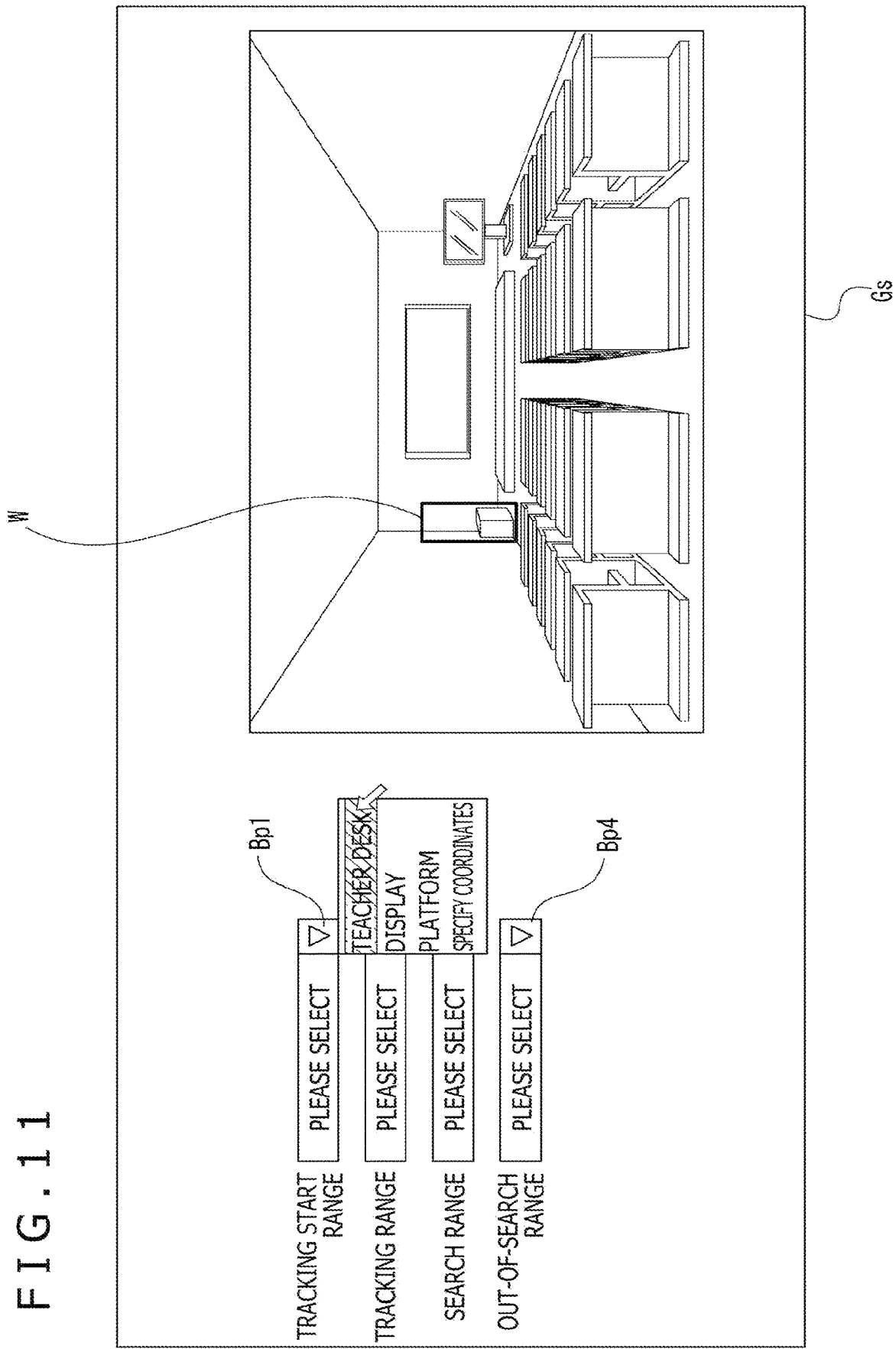
FIG. 11 is a diagram illustrating a presentation example of frame information according to the embodiment.
Figure 12:
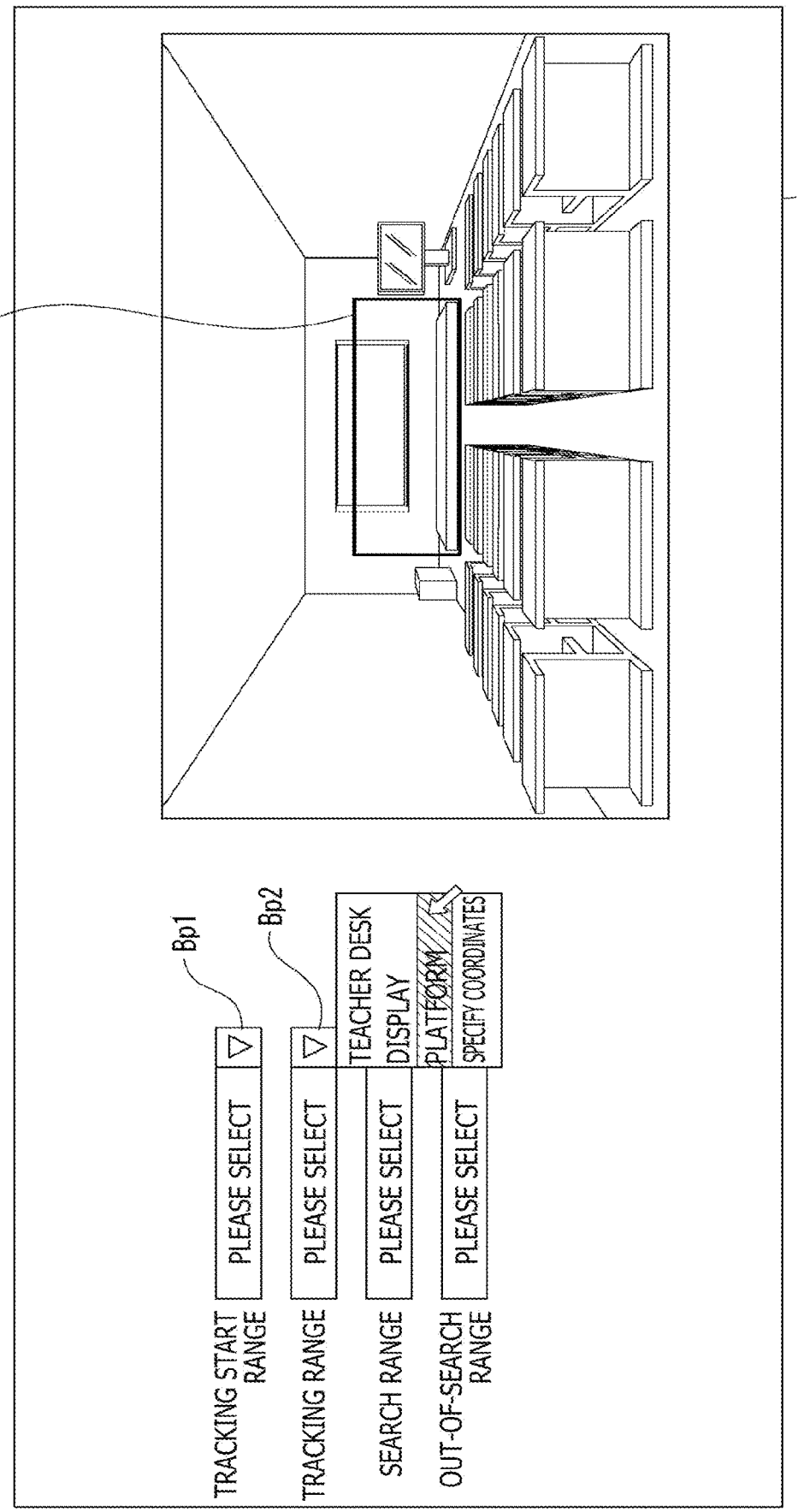
FIG. 12 is a diagram illustrating another presentation example of the frame information according to the embodiment.

In this case, the presentation processing section F2 of the present example causes, in response to the object being selected from the list, information indicating the range corresponding to the selected object to be presented on a captured image, as illustrated by way of example in FIG. 11 or FIG. 12.

As illustrated in FIG. 11 or FIG. 12, the presentation processing section F2 of the present example causes the display section 17 to display a screen where a captured image acquired from the imager 2 is arranged as an object selection screen Gs along with the pull-down buttons Bp (Bp1 to Bp4) for the above-described various ranges. A captured image determined to be a target for the object recognition process by the object recognition section F1 is used as the captured image in the present example.

FIG. 11 illustrates a presentation example of range information provided in a case where "TEACHER DESK" listed on the list is selected. In the present example, a rectangular range is set as the range corresponding to the selected object and, as the range information corresponding thereto, frame information W indicating an outline of the range corresponding to the selected object is presented.

FIG. 12 illustrates a presentation example of the frame information W provided in a case where "PLATFORM" is selected.

Here, an operation for selecting an object, which is a trigger for presentation of the frame information W, may be a mouse-over operation instead of a click operation or a tap operation. That is, it is also possible to cause, in response to an object on the list being moused over, information indicating a range corresponding to the object moused over to be presented on the captured image.

It should be noted that although illustration is omitted, in presenting the frame information W, display control, such as lowering the lightness of an image region other than the range indicated by the frame information W, may be performed to enhance the range corresponding to the selected object in the captured image.

Figure 13:
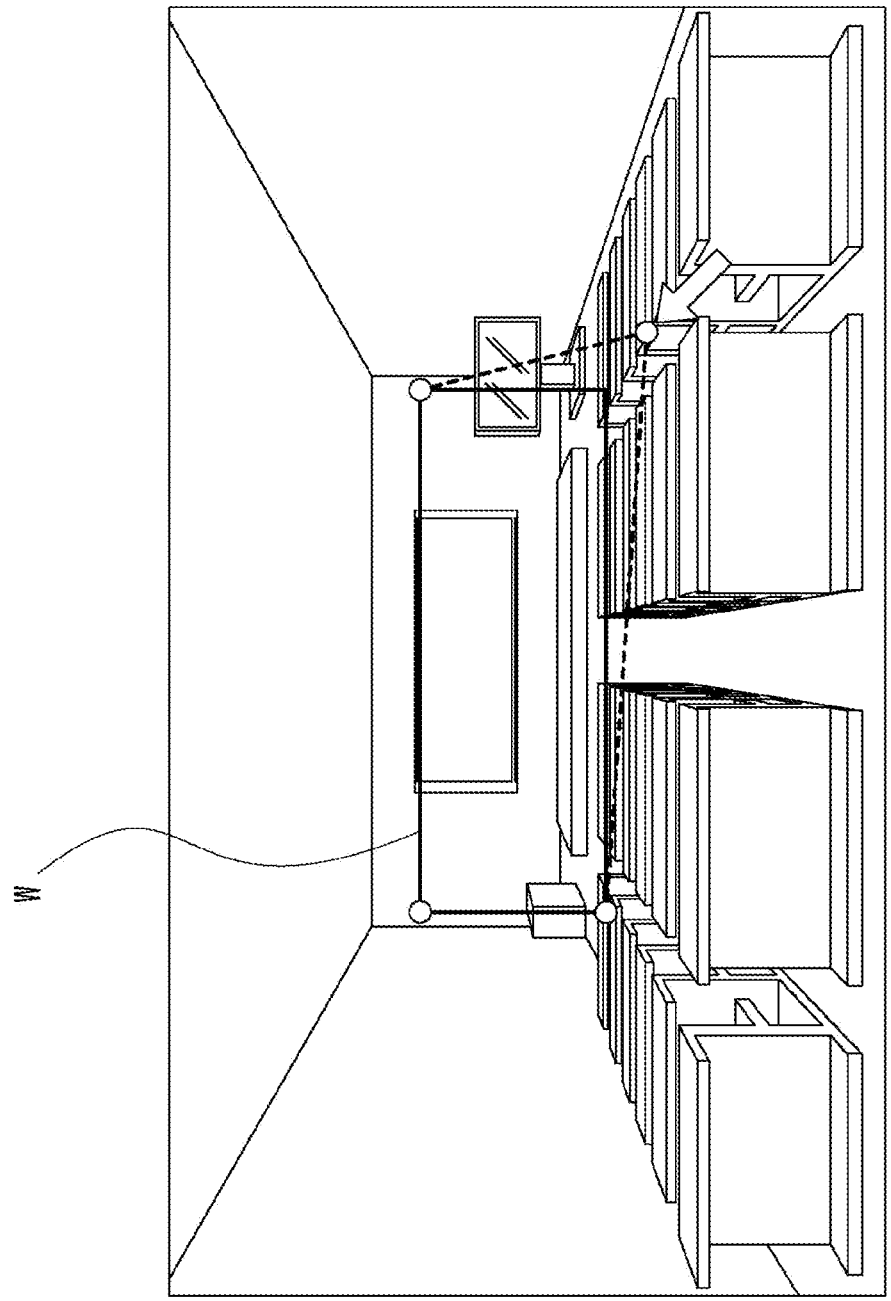
FIG. 13 is a diagram of assistance in explaining an operation for changing a range corresponding to a selected object.

In addition, in the present example, a size or a shape of the range can be changed by applying an operation to the presented frame information W, as illustrated by way of example in FIG. 13.

In the present example, in response to a drag operation applied to a frame presented as the frame information W, the shape or the size of the frame is changed. That is, a change (adjustment) is made to the range corresponding to the selected object. It should be noted that the shape herein refers to merely a shape that falls within a category of rectangles, not including a change to a shape different from a rectangle.

The tracking processing section F3 waits for, for each of the various ranges, an operation for fixing a range after an object is selected from the list. In the present example, the operation for fixing the range is, for example, re-operating the pull-down button Bp for the target range (i.e., an operation for closing the list displayed in a pull-down manner).

In a case where the operation for fixing the range is performed, the tracking processing section F3 stores the information indicating the range.

Further, the tracking processing section F3 waits for a selection completion operation, that is, an operation indicating completion of selection for all the various ranges, and performs, in a case where the selection completion operation is performed, a setting process of the various ranges. That is, for the various ranges, i.e., the tracking start range, the tracking range, the search range, and the out-of-search range, a process to set each of the various ranges, which are to be used during tracking imaging, is performed on the basis of the information regarding the range stored in response to the above-described operation for fixing the range.

In this case, the set range information includes, at least, information regarding coordinates in the captured image.

In the present example, wide-angle imaging is performed with a zoom lens set at a widest-angle side (i.e., set at a wide end) to capture an image that is to be used for object recognition, whereas during tracking the subject, imaging is performed at an angle of view narrower than during the wide-angle imaging. Accordingly, as the range information regarding the various ranges in the present example, information regarding a focal length during wide-angle imaging is also set in addition to the above-described information regarding coordinates.

It should be noted that the example where the operation for changing the range is an operation applied to the frame is given above. However, the operation for changing the range may be any other operation such as dragging, for example, a part of a peripheral portion of the range that is inside relative to the frame. It is sufficient if an operation for changing the range is an operation applied to at least the information indicating the range.

3. Process Steps

Description will be made on specific steps of a process to be performed to implement the range setting technique as the above-described embodiment with reference to flowcharts in FIG. 14 to FIG. 16.

It should be noted that description will be made here by way of example on a case where the process for implementing the range setting technique as the embodiment is to be implemented by a software process of the CPU 11. However, the process described below can be performed by hardware.

Figure 14:
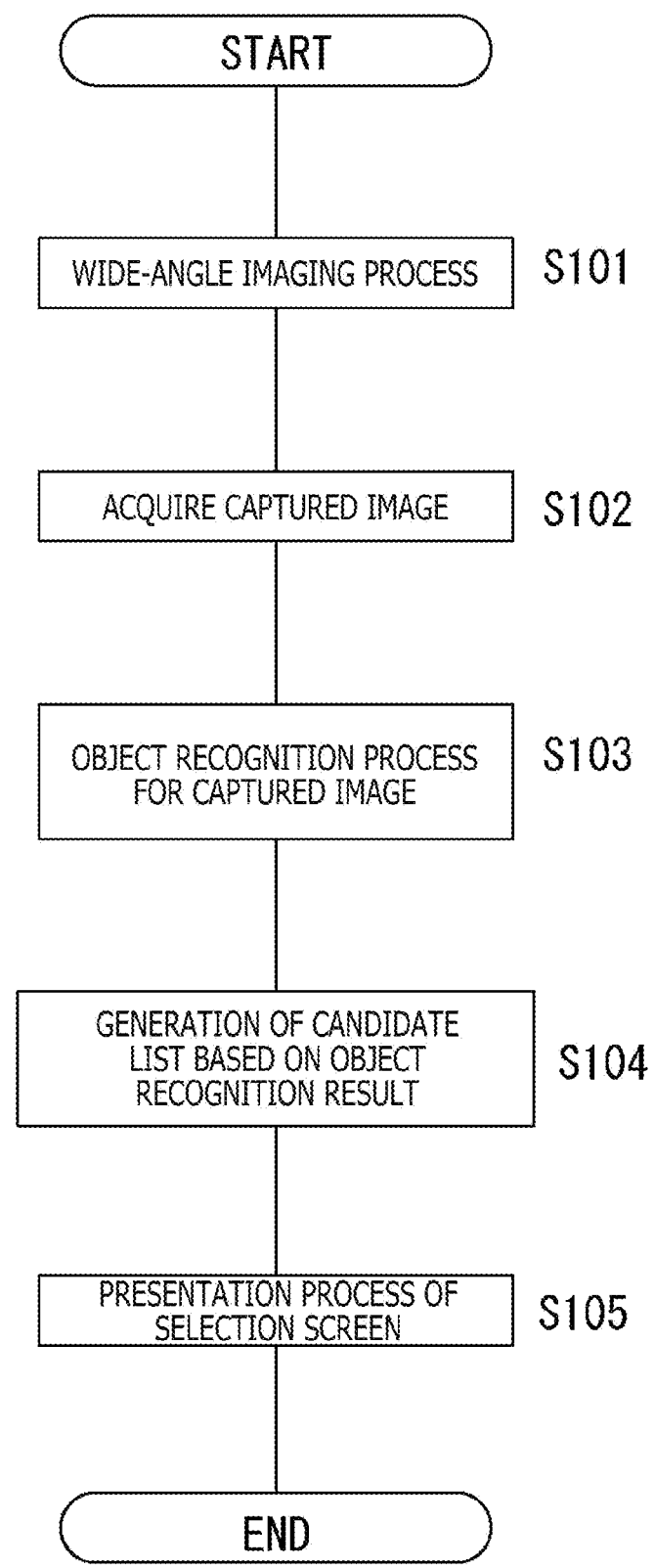
FIG. 14 is a flowchart illustrating a process being done before presentation of a selection screen.

FIG. 14 is a flowchart illustrating a process being done before presentation of the selection screen Gs. First, the CPU 11 performs a wide-angle imaging process in Step S101. That is, the imager 2 is controlled to cause the above-described wide-angle imaging to be performed.

In Step S102 subsequent to Step S101, the CPU 11 acquires a captured image. That is, an image captured by the wide-angle imaging performed in Step S101 is acquired from the imager 2.

Subsequently, in Step S103, the CPU 11 applies the object recognition process to the captured image. That is, by virtue of the above-described process as the object recognition section F1, a process of recognition of predetermined objects, such as the teacher desk o1, the thing to write on o2, the platform o3, the display o4, and the seating section o5, is performed.

In response to the object recognition process in Step S103 being performed, the CPU 11 performs a generation process of a candidate list based on an object recognition result in Step S104. It means that in the present example, a candidate list based on the object recognition result is generated for each of the various ranges, i.e., the tracking start range, the tracking range, the search range, and the out-of-search range, on the basis of the correspondence relation information I1 illustrated in FIG. 10. Specifically, lists including all the actually recognized objects among the objects defined in the correspondence relation information I1 are generated for these various ranges.

In Step S105 subsequent to Step S104, the CPU 11 performs, as a presentation process of the selection screen Gs, a process to cause the selection screen Gs as illustrated in FIG. 11 to be displayed on the display section 17 and terminates a series of processes illustrated in FIG. 14.

In the present example, the captured image acquired by wide-angel imaging is displayed in the selection screen Gs as described above. In addition, in the selection screen Gs, in response to the pull-down button Bp being operated, the list corresponding to the range the pull-down button Bp for which is operated among the lists generated in Step S104 is displayed in a pull-down manner.

Figure 15:
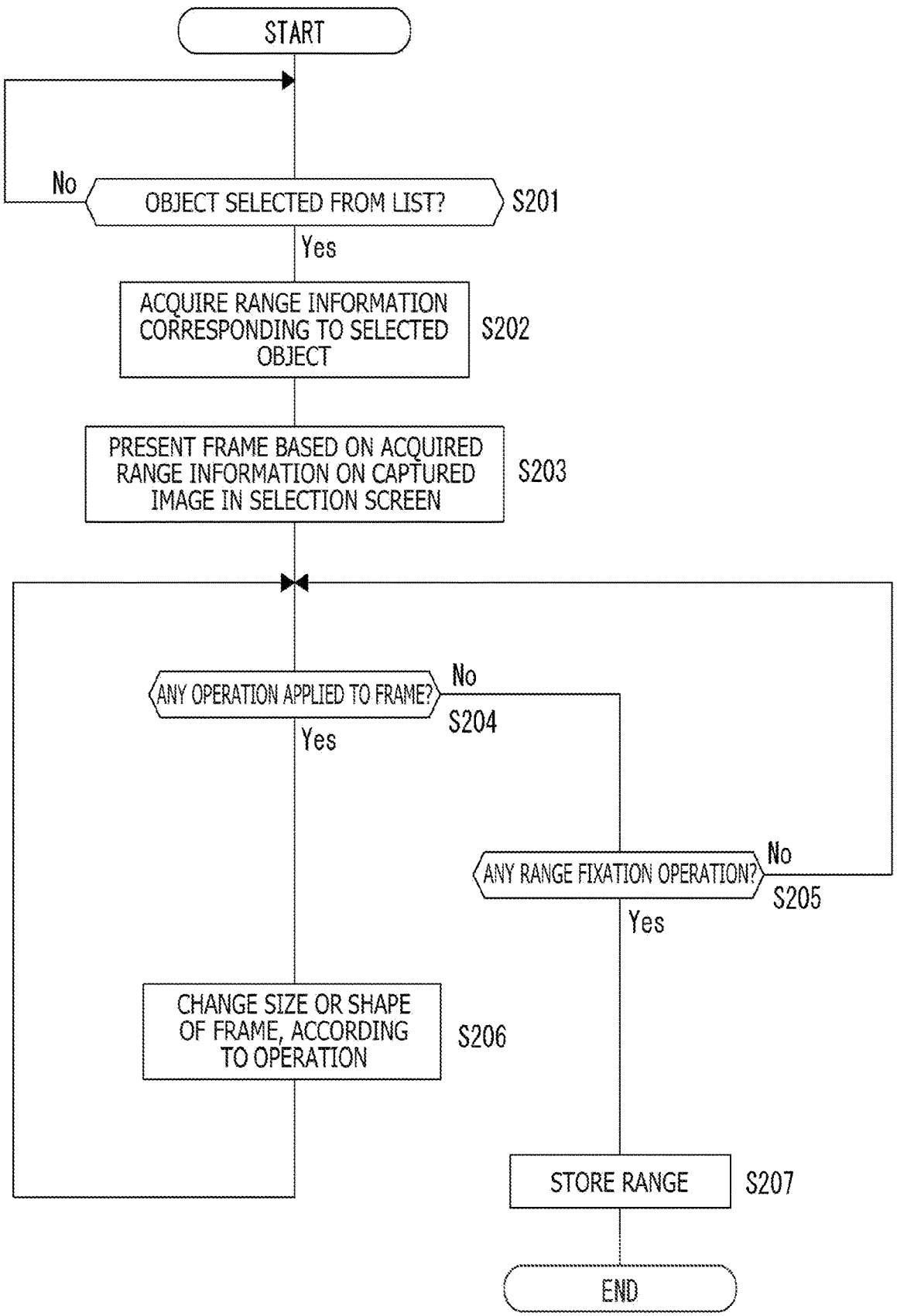
FIG. 15 is a flowchart of a process corresponding to selection of an object to fixation of a range.

FIG. 15 is a flowchart of a process corresponding to selection of an object to fixation of a range.

It should be noted that the process illustrated in FIG. 15 is started in response to the list of objects being presented in response to the pull-down button Bp in the selection screen Gs being operated. The CPU 11 applies, in response to a user operation, the process illustrated in FIG. 15 to each of the various ranges, i.e., the tracking start range, the tracking range, the search range, and the out-of-search range.

First, the CPU 11 waits until an object is selected from the list in Step S201 and, in response to an object being selected from the list, proceeds to Step S202, acquiring range information corresponding to the selected object. That is, information regarding the selected object, the information indicating a range of the object recognized in the object recognition process, is acquired and, on the basis of the information, a range corresponding to the object is calculated and acquired. In the present example, the range corresponding to the object is a range extended to be larger than the range of the recognized object (a range extended at least in a vertical direction). For this reason, a range extended to be larger than the recognized range is calculated and acquired in Step S202.

In Step S203 subsequent to Step S202, the CPU 11 performs a process for presenting a frame based on the acquired range information on the captured image in the selection screen Gs. That is, the CPU 11 performs a control relative to the display section 17 to cause the above-described frame information W, or frame information W indicating the range acquired in Step S202, to be displayed on the captured image in the selection screen Gs.

In Step S204 subsequent to Step S203, the CPU 11 determines whether or not any operation is applied to the frame and, in a case where the CPU 11 determines that no operation is applied to the frame, determines whether or not a range fixation operation (in the present example, re-operation of the pull-down button Bp as described above) is performed in Step S205. In a case where the CPU 11 determines that no range fixation operation is performed, the CPU 11 returns to Step S204. The process in Steps S204 and S205 provides a loop process to wait for either an operation applied to the frame or a range fixation operation.

In a case where the CPU 11 determines that an operation is applied to the frame in Step S204, the CPU 11 proceeds to Step S206 to perform a process to change the size or the shape of the frame, according to the operation, and returns to Step S204.

In contrast, in a case where the CPU 11 determines that a range fixation operation is performed in Step S205, the CPU 11 proceeds to Step S207 to perform a range storing process and terminates a series of processes in FIG. 15. In the storing process in Step S207, a process to store the information regarding the range, which is acquired in Step S202, is performed in a case where no operation is applied to the frame, whereas information indicating a range of a frame at the time when the range fixation operation is performed is stored in a case where an operation is applied to the frame to make a change to at least either the size or the shape.

Figure 16:
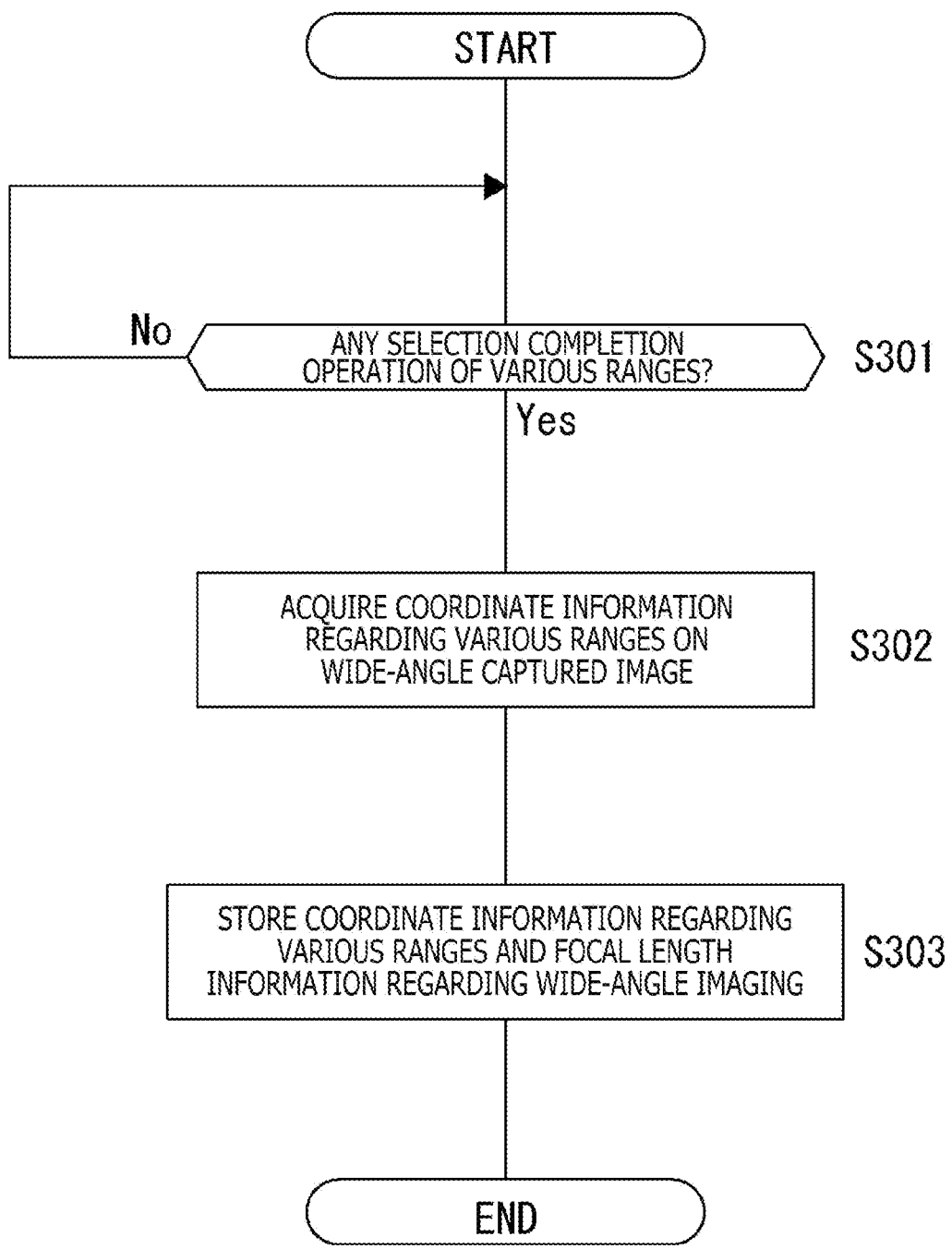
FIG. 16 is a flowchart of a process related to setting of the various ranges.

FIG. 16 is a flowchart of a process related to setting of the various ranges.

Frist, in Step S301, the CPU 11 waits until an operation to complete selection of the various ranges is performed. In the present example, the operation to complete the selection of the various ranges is, for example, an operation of a selection completion button, which is not illustrated, provided in the selection screen Gs. Thus, in the process in Step S301, the operation of the selection completion button is awaited.

In a case where the operation to complete selection of the various ranges is performed, the CPU 11 acquires, in Step S302, information regarding coordinates of each of the various ranges on a wide-angle captured image and performs, in subsequent Step S303, a process to store the information regarding the coordinates of each of the various ranges and information regarding a focal length for wide-angle imaging, then terminating a series of processes illustrated in FIG. 16.

Here, the information regarding the focal length during wide-angle imaging may be acquired from the imager 2 or information regarding a designated focal length of the imager 2 during the previous wide-angle imaging process in Step S101 may be used.

In addition, in a case where a focal length during tracking imaging is fixed at a predetermined focal length in advance, as the information regarding the range, information regarding coordinates during wide-angle imaging may be converted to information regarding panning and tilting angles at the predetermined focal length and may set.

4. Various Modification Examples

[4-1. First Modification Example]

Here, the example where objects to be listed on the list are defined in advance in the correspondence relation information I1 is given above. However, the use of the correspondence relation information I1 is not essential.

For example, a technique where all the objects recognized in the object recognition process are listed on the lists of all the tracking start range, the tracking range, the search range, and the out-of-search range can also be employed.

Alternatively, while all the recognized objects are listed on the lists of all the ranges in an initial state as described above, the objects to be listed can be selected later for each of the ranges, according to a history of selection of the objects from the list for each of the ranges. For example, a technique where, for each range, first-ranking to predetermined upper-ranking objects having been frequently selected from the list are listed on the list of that range can be employed.

In that case, in response to an object being selected from the list, the CPU 11 sequentially stores, for each range, information indicating which object is selected, as a history of selection. Then, in presenting the selection screen Gs, for example, after tracking imaging is performed for a predetermined number of times or more (i.e., after a predetermined number of history samples are collected), the CPU 11 selects, for each of the various ranges, first-ranking to predetermined upper-ranking objects having been frequently selected as candidate objects, to be listed on the list, with reference to the corresponding history of selection. Then, in presenting the list, the CPU 11 performs the presentation process of the list where the candidate objects are listed.

By virtue of the list based on the history of selection being presented as described above, only the objects suitable for each range can be presented as candidates without the use of the correspondence relation information I1.

This eliminates the necessity of manually creating the correspondence relation information I1 in advance in order to reduce a burden on a user in selecting an object from the candidate list, which makes it possible to reduce an operational burden related to the development of the information processor 1.

[4-2. Second Modification Example]

In the explanation hereinabove, the example where only a single object is selected from the list to set the range is given. However, a plurality of objects is also selectable.

Figure 17:
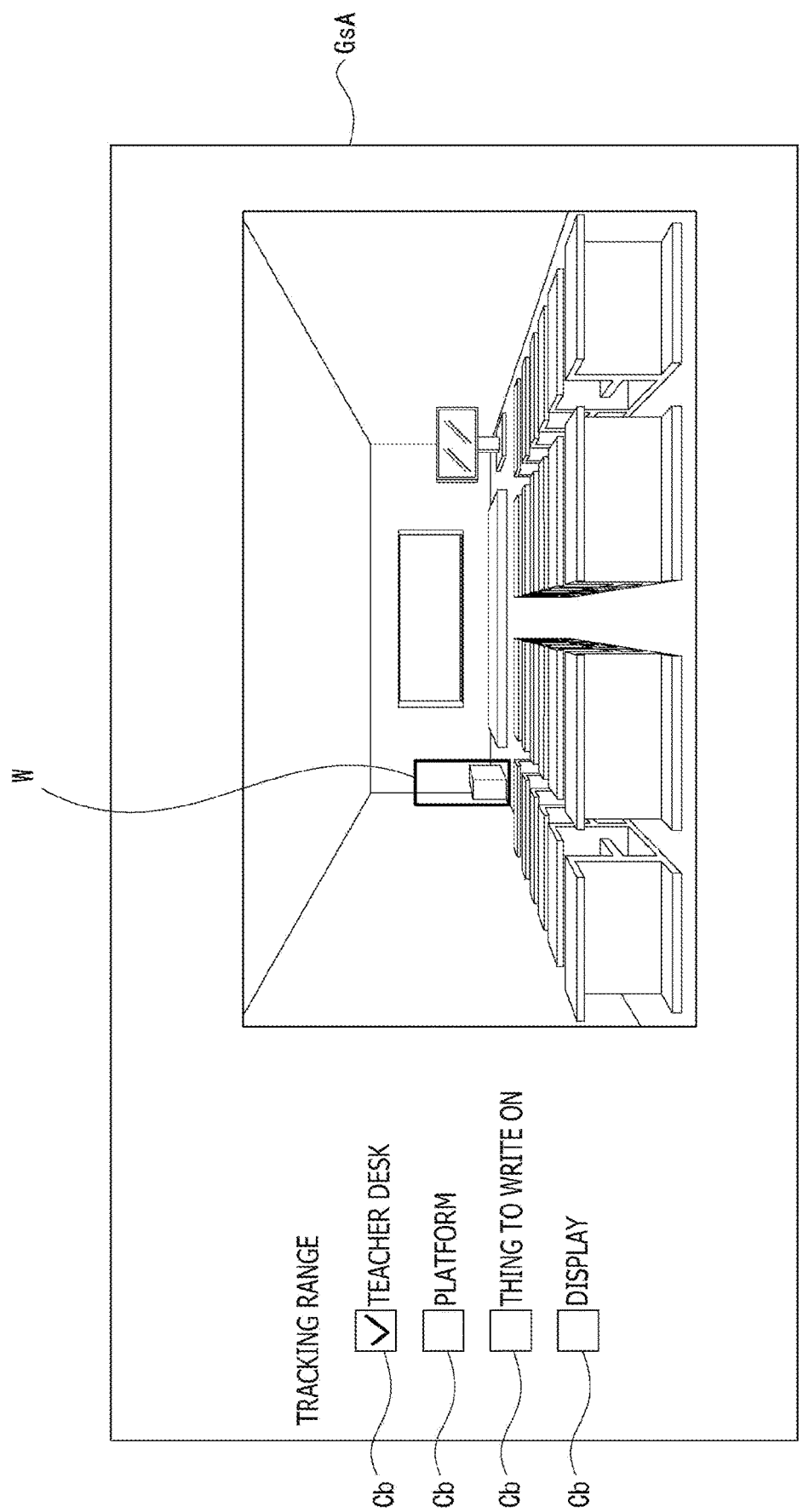
FIG. 17 is a diagram illustrating an example of the selection screen where a plurality of objects is selectable from a list.

FIG. 17 illustrates an example of the selection screen GsA where a plurality of objects is selectable from a list.

In the selection screen GsA, a checkbox Cb is provided for each object in the list of objects for a target range (in the figure, the tracking range is illustrated by way of example) among the tracking start range, the tracking range, the search range, the out-of-search range, as illustrated, allowing for selecting the object by an operation of checking the check box Ch.

Figure 18:
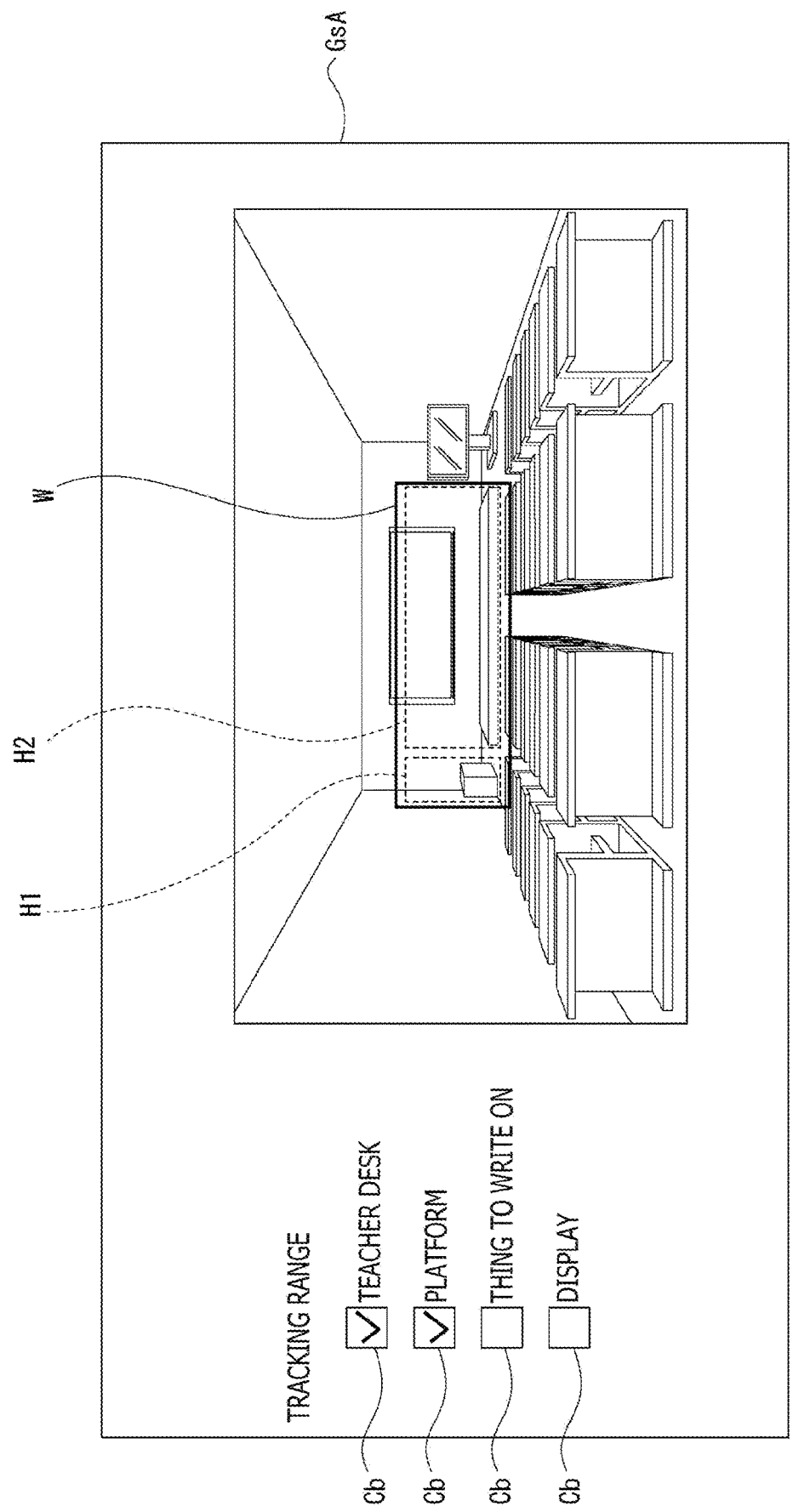
FIG. 18 is a diagram illustrating a presentation example of the frame information presented in a case where a plurality of objects is selected from the list.

Here, in the present example, in a case where a plurality of objects is selected from the list, a process to present, on a captured image, the frame information W indicating a range including the selected objects is performed, as illustrated by way of example in FIG. 18. The figure illustrates by way of example the frame information W corresponding to a case where two of the objects, "TEACHER DESK" and "PLATFORM," are selected from the list. Therefore, information indicating a range including a range H1, which is a range corresponding to "TEACHER DESK" illustrated in the figure, and a range H2, which is a range corresponding to "PLATFORM," is presented as the frame information W in this case.

The CPU 11 in this case sets, in a case where an operation to fix the range indicated by the presented frame information W as described above is performed, the range indicated by the frame information W as a target range (in the example in the figure, the tracking range).

By virtue of the process as the second modification example as described above, in a case where the user wants to set a range covering a plurality of objects, a user only has to perform at least an operation to select those objects from the list.

Therefore, it is possible to reduce an operational burden on a user, the operational burden being related to the setting of a tracking range covering a plurality of objects.

It should be noted that although the tracking range is taken as an example above, this similarly applies to any of other ranges such as the tracking start range and the search range. In a case where a plurality of objects is selected from the list, the frame information W indicating the range including the selected objects can be presented on the captured image.

[4-3. Third Modification Example]

Here, the tracking start range can also be referred to as a range where search for a subject that is a tracking target is to be performed at the start of tracking imaging. In addition, the tracking range can also be referred to as a range where search for a subject that is a tracking target is to be performed during tracking imaging. The search range is a range where if a subject that is a tracking target is lost as described above, search for the subject is to be performed. In view of these points, the tracking start range, the tracking range, and the search range can each also be referred to as a range where search for a subject is to be performed.

In contrast, the out-of-search range is a range where search for a subject is not to be performed in order to prevent a subject that is not a tracking target from being erroneously tracked as described above. Thus, if an object selected for the out-of-search range is also selected for any of the tracking start range, the tracking range, and the search range other than the out-of-search range, inconsistency of the range setting occurs.

For the purpose of preventing such occurrence of inconsistency, the present example proposes the following technique. That is, the technique is intended to prevent an object selected from either the candidate list for a range other than the out-of-search range or the candidate list for the out-of-search range from being presented in a selectable state in the other candidate list.

Figure 19:
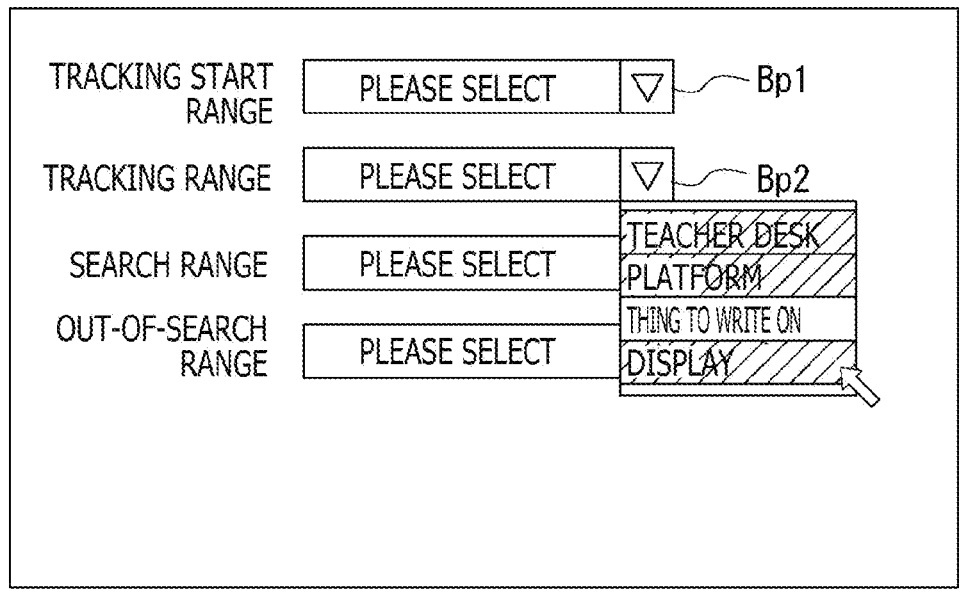
FIG. 19 is a diagram for explaining a first example of a presentation process according to a third modification example.
Figure 20:
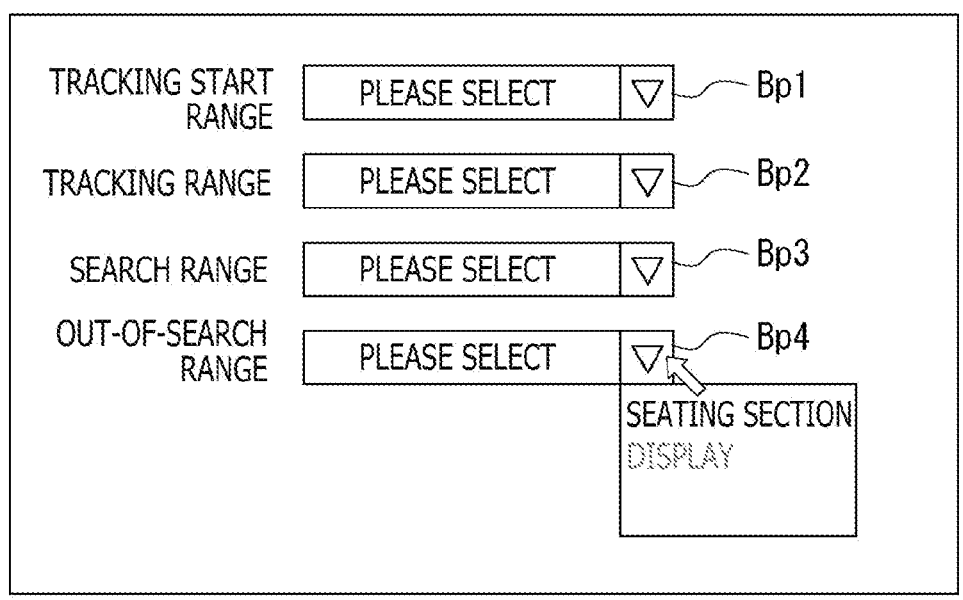
FIG. 20 is likewise a diagram for explaining the first example of the presentation process according to the third modification example.

FIG. 19 and FIG. 20 illustrate specific examples.

FIG. 19 illustrates an example where objects "TEACHER DESK," "PLATFORM," and "DISPLAY" are selected from the candidate list for the tracking range.

The CPU 11 in this case performs, in presenting the candidate list of the out-of-search range after the object selection is performed for the tracking range as described above, a presentation process of the list such that "DISPLAY," which has already been selected on a tracking-range side, is not displayed in a state for a user to select. For example, "DISPLAY" is displayed in a gray-out manner as illustrated in FIG. 20.

It should be noted that in terms of being not in a state for a user to select, the corresponding object can be hidden instead of being displayed in a gray-out manner.

Attentively, in order to prevent inconsistency of the range setting, an error notification indicating occurrence of inconsistency can be provided to a user. That is, in a case where an object selected from either one of the candidate list for a range other than the out-of-search range and the candidate list for the out-of-search range is also selected from the other candidate list, a process to present error information can be perform.

Figure 21:
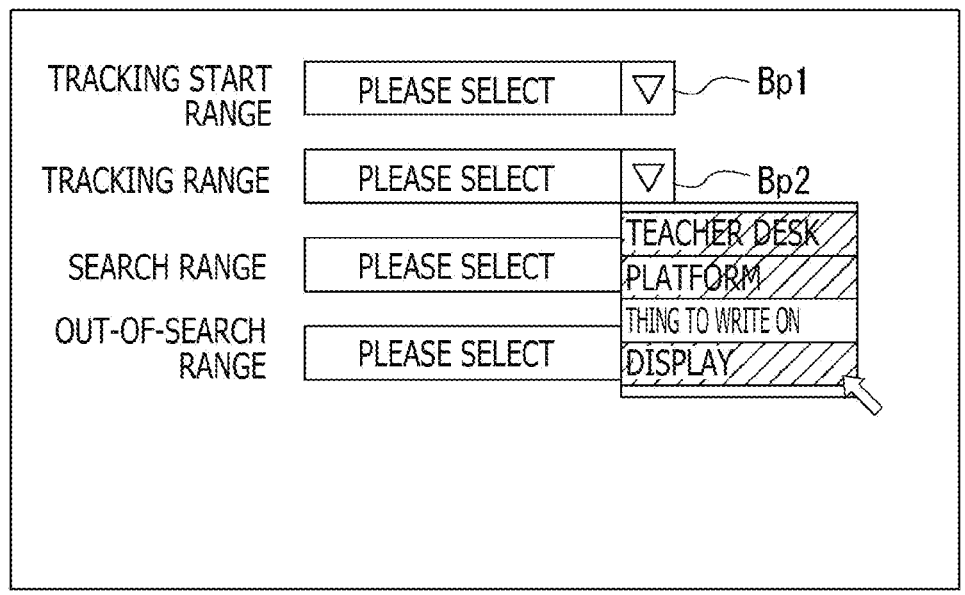
FIG. 21 is a diagram for explaining a second example of the presentation process according to the third modification example.
Figure 22:
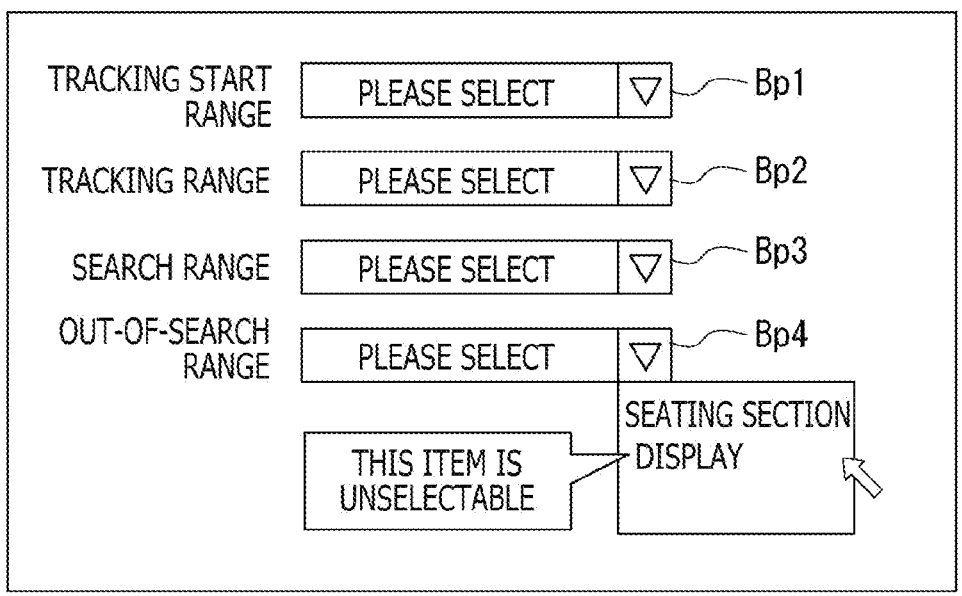
FIG. 22 is likewise a diagram for explaining the second example of the presentation process according to the third modification example.

FIG. 21 and FIG. 22 are diagrams of assistance in explaining specific examples. For example, in a case where the objects "TEACHER DESK," "PLATFORM," and "DISPLAY" are selected from the candidate list for the tracking range as illustrated in FIG. 21 and then "DISPLAY" is selected from the candidate list of the out-of-search range, a process to present error information indicating that "DISPLAY" is unselectable is performed.

Thus, an error notification is provided to a user in response to an inconsistent selection being done, which makes it possible to prevent occurrence of inconsistency of the range setting.

[4-4. Fourth Modification Example]

Instead of a range corresponding to an object, a range set on the basis of history information regarding a position of a subject (hereinafter, referred to as a "position-history-dependent range") can be presented as a candidate for each of the various ranges related to tracking imaging.

An example of the position-history-dependent range may be a range where a subject that is a tracking target often passes (frequently passed range). The range where a subject often passes can also be referred to as a range where a detection frequency of the subject is high and thus can be obtained on the basis of the history information regarding the position of the subject.

Specifically, the CPU 11 in this case generates, as the history information regarding the position, information where positions at which during a previous tracking imaging of a subject, the subject has been detected per unit of time (for example, every few seconds or the like) are accumulated. Then, the CPU 11 sets, on the basis of the generated history information, a range where the detection frequency of the subject reaches a certain level or higher as "RANGE OFTEN PASSED THROUGH."

The CPU 11 in this case generates a list including information indicating "RANGE OFTEN PASSED THROUGH," which is set as described above, as an option. The generation of that list is performed for, among the tracking start range, the tracking range, the search range, and the out-of-search range, at least the tracking range.

The CPU 11 then performs a process for presenting the generated list to a user.

Figure 23:
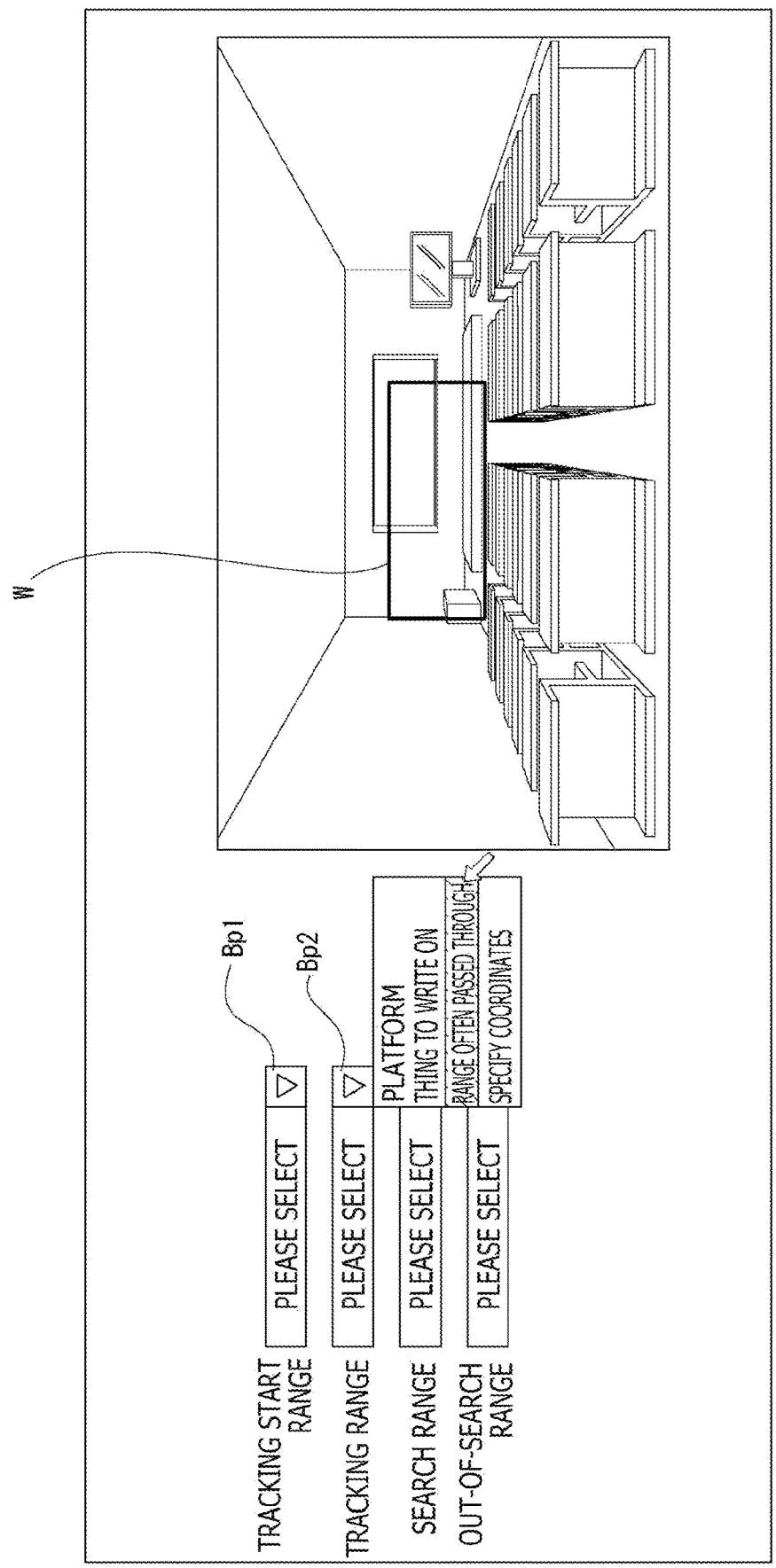
FIG. 23 is a diagram illustrating a presentation example according to a fourth modification example.

FIG. 23 is a diagram for explaining a presentation example of the list.

In the list in this case, an item "RANGE OFTEN PASSED THROUGH" is listed along with information indicating the name of an object recognized from a captured image, as illustrated. In the present example, in a case where an operation to select "RANGE OFTEN PASSED THROUGH" is performed, the frame information W indicating that range is likewise presented on the captured image.

It should be noted that FIG. 23 gives an example where "RANGE OFTEN PASSED THROUGH" is listed on the list of the tracking range. However, "RANGE OFTEN PASSED THROUGH" can likewise be listed on the lists for the search range and the tracking start range.

Here, the position-history-dependent range is not limited to "RANGE OFTEN PASSED THROUGH." For example, it is favorable that a place where a subject often stays (a place frequently stopped at) be included in the search range. Accordingly, a range corresponding to a place where a subject often stays can be listed on the list as the position-history-dependent range. Alternatively, since a place where the detection frequency of the subject is low should be excluded from a range of search, for example, a range corresponding to that place where the detection frequency is low may be listed as the position-history-dependent range on the list of the out-of-search range.

In addition, a different position-history-dependent range can be set for each subject that is a tracking target (i.e., in the present example, for each teacher).

In that case, the CPU 11 generates and stores teacher-by-teacher basis history information as the history information of the position in advance. The CPU 11 then sets the position-history-dependent range on the basis of, among the history information stored on a teacher-by-teacher basis, the history information regarding a teacher that is a tracking target. At this time, it may be selected by a user operation which teacher is the teacher that is the tracking target. Alternatively, the CPU 11 may select which teacher is the teacher that is the tracking target, on the basis of time table information regarding lectures to be given in the classroom (including at least information indicating a start time and a teacher in charge of each lecture).

It should be noted that an example where the position-history-dependent range is presented as one coordinate on the list is given above. However, the position-history-dependent range is also usable as information for adjusting a range corresponding to a recognized object. For example, widening/narrowing adjustment of a range corresponding to "TEACHER DESK" or "PLATFORM" may be performed in consideration of "RANGE OFTEN PASSED THROUGH."

5. Other Modification Examples

The embodiment is not limited to the specific examples described above, and a variety of modification examples are possible.

For example, in setting or adjusting the various ranges related to tracking, information regarding a writing region, that is, a region where writing is performed, in the thing to write on o2 can also be referred to.

For example, in a situation where a thing to write on is relatively elongated and a teacher writes only at a partial region, such as a corner, of the thing to write on, in a situation where tracking of a subject is performed with a range corresponding to "THING TO WRITE ON" being set as a tracking range, adjustment may be performed to cause the tracking range to be narrowed from the range corresponding to the entire thing to write on to a partial range including the writing region.

Alternatively, in a situation where a range including "TEACHER DESK" and "THING TO WRITE ON" is designated as a tracking range, while only a range corresponding to "TEACHER DESK" is set as the tracking range to track a subject at the start of a lecture (at the start of tracking imaging), the tracking range may be extended, in response to detection of writing relative to the thing to write on, to the range including "TEACHER DESK" and "THING TO WRITE ON" to perform tracking.

It should be noted that writing can be detected by a character recognition technology based on OCR (Optical Character Recognition/Reader) or the like.

In addition, concerning the various ranges, i.e., the tracking start range, the tracking range, the search range, and the out-of-search range, it is assumed that object selection from the list is basically performed for all the ranges in the above description. However, it is not necessary to make selections of all the various ranges, and an item for which no selection is made may be subjected to a control related to tracking according to predetermined setting (initial setting).

For example, in a case where no selection is made for the tracking range, a range where pan-tilt driving is possible may be set as the tracking range. In addition, in a case where no selection is made for the tracking start range or the search range, tracking may be started from a center position in a captured image. In addition, in a case where no selection is made for the out-of-search range, a subject may be searched for all over the ranges.

In addition, the example where imaging for object recognition is performed by wide-angle imaging with the use of the zoom function is given in the above description. However, the imaging for object recognition can be performed by panoramic imaging. Specifically, the CPU 11 in that case causes the imager 2 to carry out imaging for a plurality of times while being panned and/or tilted, thereby obtaining a plurality of captured images. Then, these captured images are subjected to panoramic combination to generate a panoramic image, and the object recognition process targeted at the panoramic image is performed.

This makes it possible to appropriately set the various ranges related to tracking even in a case where the imager 2 equipped with no zoom function is used.

Here, in the explanation hereinabove, the example where the present technology is applied in a case where tracking imaging is to be performed with the use of a mechanical pan-tilt function is given. However, the present technology is also favorably applicable in a case where tracking of a subject is to be performed by a control of a position of trimming (a position of cropping) from a captured image.

In a case where a tracking image of a subject is obtained by such a control of the position of trimming, the tracking process of the subject can be defined as a process to control the position of trimming such that the subject is maintained at a specific position within an output frame of the captured image.

In addition, FIG. 1 referred to earlier illustrates the example where the information processor 1 and the imager 2 are separate components. However, the information processor 1 can also be provided as an apparatus integrated with the imager 2. In addition, the information processor 1 can also be an apparatus integrated with the recorder 3.

In addition, the example where the present technology is applied in a case where tracking imaging targeted at a teacher who gives a lecture in a classroom is given in the explanation hereinabove. However, an example of a subject that is a tracking target is not limited thereto in the present technology. For example, the present technology is also favorably applicable in a case where an instructor of in-house training or a singer, a player, or the like of a music live performance is a tracking target.

6. Summary of Embodiment

As described above, an information processor (corresponding to F1) as an embodiment includes a presentation processing section (corresponding to F2) configured to perform a process to present a list of objects recognized in an object recognition process of a captured image to a user, and a tracking processing section (corresponding to F3) configured to set a tracking range of a subject corresponding to an object selected by the user from the list presented by the presentation processing section and perform a tracking process of the subject on the basis of the set tracking range.

Thus, it can be sufficient that an operation necessary for setting the tracking range of the subject is at least only an operation to select an object from the list.

Therefore, it is possible to reduce an operational burden on the user, the operational burden being related to setting of the tracking range of the subject.

In addition, in the information processor as the embodiment, the presentation processing section is configured to perform a process to present, as the list of the objects, a candidate list for the tracking range and a candidate list for a tracking start range of the subject, and the tracking processing section is configured to set, in a case where an object is selected from the candidate list for the tracking start range, the tracking start range corresponding to the selected object.

By virtue of setting the tracking start range, the tracking process of the subject can be started from a range where the subject is likely to exist at the start of imaging.

Therefore, it is possible to smoothly start tracking of the subject.

Further, in the information processor as the embodiment, the presentation processing section is configured to perform a process to present, as the list of the objects, a candidate list for the tracking range and a candidate list for a search range that is a search range where, in a case where the subject is lost, the subject is to be searched for, and the tracking processing section is configured to set, in a case where an object is selected from the candidate list for the search range, the search range corresponding to the selected object.

By virtue of setting the search range, in a case where a subject being tracked is lost, search for the subject can be performed with a range where the subject is highly likely to exist set as a target.

Therefore, it is possible to smoothly re-start tracking after the subject is lost.

Further, in the information processor as the embodiment, the presentation processing section is configured to perform a process to present, as the list of the objects, a candidate list for the tracking range and a candidate list for an out-of-search range that is a range excluded from a target for search for the subject, and the tracking processing section is configured to set, in a case where an object is selected from the candidate list for the out-of-search range, the out-of-search range corresponding to the selected object.

By virtue of setting the out-of-search range, a range that is undesirable to be included in a subject search range in terms of appropriately performing tracking of a subject that is a target, such as a range where a subject that is not a tracking target is supposed to exist, can be excluded to perform search for the subject.

Therefore, it is possible to improve a subject tracking performance.

Further, in the information processor as the embodiment, the presentation processing section is configured to perform a process to present, as the list of the objects, a candidate list for the tracking range and a candidate list for a different range that is a range related to the tracking process different from the tracking range, and perform a process to present, as the candidate list for the tracking range and the candidate list for the different range, lists objects listed on which are at least partially different.

This makes it possible to present an object suitable as a candidate for each of the tracking range and the different range.

Therefore, it is possible to prevent an unnecessary candidate from being listed on the list and reduce a burden on a user in selecting an object from the candidate list.

Further, in the information processor as the embodiment, the presentation processing section is configured to perform a process to present the candidate list for the tracking range and the candidate list for the different range on the basis of correspondence relation information indicating a correspondence relation of objects to be listed for each of the tracking range and the different range.

This makes it possible to present only an object suitable as a candidate for each range by a simple process of generating the candidate list with reference to the correspondence relation information.

Therefore, it is possible to achieve, by a simple process, a reduction in burden on a user in selecting an object from the candidate list.

Further, in the information processor as the embodiment, the presentation processing section is configured to perform a process to present, as the list of the objects, a candidate list for the tracking range and a candidate list for a different range that is a range related to the tracking process different from the tracking range, and perform a process to present the candidate list for the tracking range and the candidate list for the different range on the basis of histories of selection of an object from each of the candidate lists.

This makes it possible to present only an object suitable for each range as a candidate on the basis of the history of selection of the objects.

Therefore, it is possible to reduce a burden on a user in selecting an object from the candidate list. In addition, in order to achieve such a reduction in burden, it is not necessary to manually create correspondence relation information indicating a correspondence relation between each range and objects, making it possible to reduce an operational burden related to development of an information processor.

In addition, in the information processor as the embodiment, the presentation processing section is configured to perform a process to present, as the candidate list for the tracking range and the candidate list for the different range, lists where objects selected on the basis of frequency of selection according to the histories of selection are listed.

This makes it possible to present, as a candidate, only an object presumed to be suitable for each range according to a high frequency of a previous selection. Therefore, it is possible to reduce a burden on a user in selecting an object from the candidate list.

Further, in the information processor as the embodiment, the presentation processing section is configured to perform, in a case where an object is selected from the list, a process to present information indicating a range corresponding to the selected object on the captured image.

This enables the user to see the range of the object selected by him/her on the captured image.

Thus, the user is allowed to intuitively understand which range of the object is selected.

In addition, the range can be seen on the captured image in addition to textual information indicating the range of the object, which makes it possible to make erroneous selection of the range unlikely to occur.

Further, in the information processor as the embodiment, the presentation processing section is configured to perform, in response to an operation being applied to the information indicating the range presented on the captured image, a process to change a size or a shape of the range.

Thus, while information indicating a corresponding range is caused to be presented in response to an object being selected from the list, the user can apply an operation to the information indicating the range, thereby issuing an instruction to change the size or the shape of the range.

Therefore, it is possible to achieve both a reduction in operational burden related to range setting and an improvement in flexibility of range setting.

In addition, in the information processor as the embodiment, the presentation processing section is configured to perform, in a case where a plurality of objects is selected from the list, a process to present information indicating ranges including the selected objects on the captured image.

Thus, in a case where the user wants to set a tracking range covering a plurality of objects, the user only has to perform at least an operation to select these objects from the list.

Therefore, it is possible to reduce an operational burden on the user, the operational burden being related to setting of the tracking range covering the plurality of objects.

Further, in the information processor as the embodiment, the presentation processing section is configured to perform a process to present the candidate list for the tracking range and the candidate list for the out-of-search range such that an object selected from either one of the candidate lists is not presented in a selectable state in the other one of the candidate lists. This makes it possible to prevent inconsistent selection from being performed, the inconsistent selection including selecting an object selected for the tracking range also as an object for the out-of-search range and selecting an object selected for the out-of-search range also as an object for the tracking range, inversely.

Therefore, it is possible to achieve appropriate range setting without inconsistency between the tracking range and the out-of-search range.

Further, in the information processor as the embodiment, the presentation processing section is configured to perform, in a case where an object selected from either one of the candidate list for the tracking range and the candidate list for the out-of-search range is selected from the other one of the candidate lists, a process to present error information.

This makes it possible to provide an error notification to the user in response to an inconsistent selection being done.

Therefore, it is possible to prevent occurrence of setting inconsistency between the tracking range and the out-of-search range.

In addition, in the information processor as the embodiment, the presentation processing section is configured to generate and present the list to the user, the list including, as an option, information indicating a position-history-dependent range that is a range set on the basis of history information regarding a position of the subject.

This makes it possible to present a range supposed to be suitable for performing tracking according to the position history of the subject, such as a range where the subject frequently passes, as a candidate for the tracking range.

Therefore, it is possible to present, as the candidate list for selecting the tracking range, a suitable list with the position history of the subject taken into consideration.

Further, in the information processor as the embodiment, the subject includes a teacher, and the presentation processing section is configured to set the position-history-dependent range on the basis of, among the history information regarding the position stored on a teacher-by-teacher basis, the history information regarding the teacher who is a tracking target.

Different teachers may have different characteristics of movement during a lecture. For example, a teacher frequently moves during a lecture, whereas another teacher does not frequently move during a lecture.

By virtue of a range that is a candidate for the tracking range being set on the basis of the position history information regarding a teacher who is a target as described above, it is possible to present a suitable candidate list with the characteristics of movement of the teacher, who is the target, during a lecture taken into consideration.

Further, in the information processor as the embodiment, in the object recognition process, a recognition process of at least one object among a platform, a teacher desk, and a thing to write on is performed, and the presentation processing section is configured to perform a process to present the list to the user, the list including the at least one of the platform, the teacher desk, and the thing to write on recognized in the object recognition process.

This makes it possible to achieve setting of the tracking range based on objects arranged in the classroom where a lecture is given.

Therefore, it is possible to set a suitable range as the tracking range for performing tracking targeted at a teacher who is giving the lecture.

In addition, an information processing method as an embodiment is an information processing method in which an information processor is configured to perform a process to present a list of objects recognized in an object recognition process of a captured image to a user, set a tracking range of a subject corresponding to an object selected by the user from the presented list, and perform a tracking process of the subject on the basis of the set tracking range.

Such an information processing method as the embodiment can also provide workings and effects similar to those of the information processor as the above-described embodiment.

A program as an embodiment is a program configured to cause an information processor to implement a function to perform a process to present a list of objects recognized in an object recognition process of a captured image to a user, set a tracking range of a subject corresponding to an object selected by the user from the presented list, and perform a tracking process of the subject on the basis of the set tracking range.

That is, the program as the embodiment is a program causing an information processor to perform the processes described with reference to FIG. 14 to FIG. 16, etc.

Such a program makes it easy to implement the information processor as the embodiment.

Further, such a program may be stored in advance in a recording medium built in equipment such as a computer apparatus, a ROM within a microcomputer equipped with a CPU, or the like. Alternatively, it may be temporarily or permanently held (stored) in a removable recording medium such as a semiconductor memory, a memory card, an optical disk, a magneto-optical disk, or a magnetic disk. In addition, such a removable recording medium may be provided as what is generally called packaged software.

In addition, such a program may be downloaded from a download site through a network, such as a LAN (Local Area Network) or the Internet, in addition to being installed on a personal computer or the like from a removable recording medium.

It should be noted that the effects described herein are merely by way of example and any other effect is also possible.

7. Present Technology

It should be noted that the present technology can also have the following configurations.

(1)
An information processor including:
a presentation processing section configured to perform a process to present a list of objects recognized in an object recognition process of a captured image to a user; and
a tracking processing section configured to set a tracking range of a subject corresponding to an object selected by the user from the list presented by the presentation processing section and perform a tracking process of the subject on the basis of the set tracking range.

(2)
The information processor according to (1), in which
the presentation processing section is configured to perform a process to present, as the list of the objects, a candidate list for the tracking range and a candidate list for a tracking start range of the subject, and
the tracking processing section is configured to set, in a case where an object is selected from the candidate list for the tracking start range, the tracking start range corresponding to the selected object.

(3)
The information processor according to (1) or (2), in which
the presentation processing section is configured to perform a process to present, as the list of the objects, a candidate list for the tracking range and a candidate list for a search range that is a search range where, in a case where the subject is lost, the subject is to be searched for, and
the tracking processing section is configured to set, in a case where an object is selected from the candidate list for the search range, the search range corresponding to the selected object.

(4)
The information processor according to any one of (1) to (3), in which
the presentation processing section is configured to perform a process to present, as the list of the objects, a candidate list for the tracking range and a candidate list for an out-of-search range that is a range excluded from a target for search for the subject, and
the tracking processing section is configured to set, in a case where an object is selected from the candidate list for the out-of-search range, the out-of-search range corresponding to the selected object.

(5)
The information processor according to any one of (1) to (4), in which
the presentation processing section is configured to
perform a process to present, as the list of the objects, a candidate list for the tracking range and a candidate list for a different range that is a range related to the tracking process different from the tracking range, and
perform a process to present, as the candidate list for the tracking range and the candidate list for the different range, lists objects listed on which are at least partially different.

(6)
The information processor according to (5), in which
the presentation processing section is configured to perform a process to present the candidate list for the tracking range and the candidate list for the different range on the basis of correspondence relation information indicating a correspondence relation of objects to be listed for each of the tracking range and the different range.

(7)
The information processor according to any one of (1) to (6), in which
the presentation processing section is configured to
perform a process to present, as the list of the objects, a candidate list for the tracking range and a candidate list for a different range that is a range related to the tracking process different from the tracking range, and
perform a process to present the candidate list for the tracking range and the candidate list for the different range on the basis of histories of selection of an object from each of the candidate lists.

(8)
The information processor according to (7), in which
the presentation processing section is configured to perform a process to present, as the candidate list for the tracking range and the candidate list for the different range, lists where objects selected on the basis of frequency of selection according to the histories of selection are listed.

(9)

The information processor according to any one of (1) to (8), in which the presentation processing section is configured to perform, in a case where an object is selected from the list, a process to present information indicating a range corresponding to the selected object on the captured image.

(10)

The information processor according to (9), in which the presentation processing section is configured to perform, in response to an operation being applied to the information indicating the range presented on the captured image, a process to change a size or a shape of the range.

(11)

The information processor according to (9) or (10), in which the presentation processing section is configured to perform, in a case where a plurality of objects is selected from the list, a process to present information indicating ranges including the selected objects on the captured image.

(12)

The information processor according to any one of (4) to (11), in which the presentation processing section is configured to perform a process to present the candidate list for the tracking range and the candidate list for the out-of-search range such that an object selected from either one of the candidate lists is not presented in a selectable state in the other one of the candidate lists.

(13)

The information processor according to any one of (4) to (11), in which the presentation processing section is configured to perform, in a case where an object selected from either one of the candidate list for the tracking range and the candidate list for the out-of-search range is selected from the other one of the candidate lists, a process to present error information.

(14)

The information processor according to any one of (1) to (13), in which the presentation processing section is configured to generate and present the list to the user, the list including, as an option, information indicating a position-history-dependent range that is a range set on the basis of history information regarding a position of the subject.

(15)

The information processor according to (14), in which the subject includes a teacher, and the presentation processing section is configured to set the position-history-dependent range on the basis of, among the history information regarding the position stored on a teacher-by-teacher basis, the history information regarding the teacher who is a tracking target.

(16)

The information processor according to any one of (1) to (15), in which, in the object recognition process, a recognition process of at least one object among a platform, a teacher desk, and a thing to write on is performed, and the presentation processing section is configured to perform a process to present the list to the user, the list including the at least one of the platform, the teacher desk, and the thing to write on recognized in the object recognition process.

(17)

An information processing method including:

by an information processor, performing a process to present a list of objects recognized in an object recognition process of a captured image to a user, setting a tracking range of a subject corresponding to an object selected by the user from the presented list, and performing a tracking process of the subject on the basis of the set tracking range.

(18)

A program causing an information processor to implement a function of:

performing a process to present a list of objects recognized in an object recognition process of a captured image to a user, setting a tracking range of a subject corresponding to an object selected by the user from the presented list, and performing a tracking process of the subject on the basis of the set tracking range.

REFERENCE SIGNS LIST

100: Tracking imaging system
1: Information processor
2: Imager
11: CPU
16: Input section
17: Display section
F1: Object recognition section
F2: Presentation processing section
F3: Tracking processing section
o1: Teacher desk
o2: Thing to write on
o3: Platform
o4: Display
o5: Seating section
Bp1, Bp2, Bp3, Bp4: Pull-down button
Gs, GsA: Selection screen
W: Frame information
Cb: Check box

The invention claimed is:

1. An information processor comprising:
a presentation processing section configured to perform a process to present a list of objects recognized in an object recognition process of a captured image to a user; and
a tracking processing section configured to set a tracking range of a subject corresponding to an object selected by the user from the list presented by the presentation processing section and perform a tracking process of the subject on a basis of the set tracking range,
wherein the presentation processing section performs the process to present, as the list of the objects, at least one of a candidate list for the tracking range or a candidate list for a tracking start range of the subject, and
wherein the presentation processing section and the tracking processing section are each implemented via at least one processor.

2. The information processor according to claim 1, wherein
the presentation processing section performs the process to present, as the list of the objects, the candidate list for the tracking range and the candidate list for the tracking start range of the subject, and the tracking processing section sets, in a case where an object is selected from the candidate list for the tracking start range, the tracking start range corresponding to the selected object.

3. The information processor according to claim 1, wherein the presentation processing section performs the process to present, as the list of the objects, the candidate list for the tracking range and a candidate list for a search range where, in a case where the subject is lost, the subject is to be searched for, and the tracking processing section is further configured to set, in a case where an object is selected from the candidate list for the search range, the search range corresponding to the selected object.

4. The information processor according to claim 1, wherein the presentation processing section performs the process to present, as the list of the objects, the candidate list for the tracking range and a candidate list for an out-of-search range that is a range excluded from a target for search for the subject, and the tracking processing section is further configured to set, in a case where an object is selected from the candidate list for the out-of-search range, the out-of-search range corresponding to the selected object.

5. The information processor according to claim 1, wherein the presentation processing section performs the process to present, as the list of the objects, the candidate list for the tracking range and a candidate list for a different range that is a range related to the tracking process different from the tracking range, and performs the process to present, as the candidate list for the tracking range and the candidate list for the different range, lists objects listed on which are at least partially different.

6. The information processor according to claim 5, wherein the presentation processing section performs the process to present the candidate list for the tracking range and the candidate list for the different range on a basis of correspondence relation information indicating a correspondence relation of objects to be listed for each of the tracking range and the different range.

7. The information processor according to claim 1, wherein the presentation processing section performs the process to present, as the list of the objects, the candidate list for the tracking range and a candidate list for a different range that is a range related to the tracking process different from the tracking range, and performs the process to present the candidate list for the tracking range and the candidate list for the different range on a basis of histories of selection of an object from each of the candidate lists.

8. The information processor according to claim 7, wherein the presentation processing section performs the process to present, as the candidate list for the tracking range and the candidate list for the different range, lists where objects selected on a basis of frequency of selection according to the histories of selection are listed.

9. The information processor according to claim 1, wherein the presentation processing section is further configured to perform, in a case where an object is selected from the list, a process to present information indicating a range corresponding to the selected object on the captured image.

10. The information processor according to claim 9, wherein the presentation processing section is further configured to perform, in response to an operation being applied to the information indicating the range presented on the captured image, a process to change a size or a shape of the range.

11. The information processor according to claim 9, wherein the presentation processing section is further configured to perform, in a case where a plurality of objects is selected from the list, a process to present information indicating ranges including the selected objects on the captured image.

12. The information processor according to claim 4, wherein the presentation processing section performs the process to present the candidate list for the tracking range and the candidate list for the out-of-search range such that an object selected from either one of the candidate lists is not presented in a selectable state in the other one of the candidate lists.

13. The information processor according to claim 4, wherein the presentation processing section is further configured to perform, in a case where an object selected from either one of the candidate list for the tracking range and the candidate list for the out-of-search range is selected from the other one of the candidate lists, a process to present error information.

14. The information processor according to claim 1, wherein the presentation processing section is further configured to generate and present the list to the user, the list including, as an option, information indicating a position-history-dependent range that is a range set on a basis of history information regarding a position of the subject.

15. The information processor according to claim 14, wherein the subject includes a teacher, and the presentation processing section is further configured to set the position-history-dependent range on a basis of, among the history information regarding the position stored on a teacher-by-teacher basis, the history information regarding the teacher who is a tracking target.

16. The information processor according to claim 1, wherein, in the object recognition process, a recognition process of at least one of a platform, a teacher desk, or a thing to write on is performed, and the presentation processing section performs the process to present the list to the user, the list including the at least one of the platform, the teacher desk, or the thing to write on recognized in the object recognition process.

17. An information processing method comprising:
by an information processor,
performing a process to present a list of objects recognized in an object recognition process of a captured image to a user, setting a tracking range of a subject corresponding to an object selected by the user from the presented list, and performing a tracking process of the subject on a basis of the set tracking range,
wherein the list of the objects includes at least one of a candidate list for the tracking range or a candidate list for a tracking start range of the subject.

18. A non-transitory computer-readable medium having embodied thereon a program, which when executed by an information processor causes the information processor to execute a method comprising:
performing a process to present a list of objects recognized in an object recognition process of a captured image to a user, setting a tracking range of a subject corresponding to an object selected by the user from the presented list, and performing a tracking process of the subject on a basis of the set tracking range,
wherein the list of the objects includes at least one of a candidate list for the tracking range or a candidate list for a tracking start range of the subject.

* * * * *